(12) United States Patent
Kurogi et al.

(10) Patent No.: US 9,590,891 B2
(45) Date of Patent: Mar. 7, 2017

(54) NODE APPARATUS, RECORDING MEDIUM THAT HAS STORED CONTROL PROGRAM THEREIN, AND METHOD OF OPERATING NODE APPARATUS

(71) Applicant: FUJITSU LIMITED, Kawasaki-shi, Kanagawa (JP)

(72) Inventors: Yasuhiro Kurogi, Fukuoka (JP); Mitsuharu Amano, Fukuoka (JP); Yayoi Nomura, Fukuoka (JP); Takayuki Okamasu, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 275 days.

(21) Appl. No.: 14/496,805

(22) Filed: Sep. 25, 2014

(65) Prior Publication Data

US 2015/0138949 A1 May 21, 2015

(30) Foreign Application Priority Data

Nov. 15, 2013 (JP) .................................. 2013-237089

(51) Int. Cl.
| | |
|---|---|
| *H04L 12/707* | (2013.01) |
| *H04L 12/24* | (2006.01) |
| *H04W 40/12* | (2009.01) |
| *H04W 40/24* | (2009.01) |
| *H04L 12/703* | (2013.01) |

(52) U.S. Cl.
CPC .......... *H04L 45/22* (2013.01); *H04L 41/0668* (2013.01); *H04W 40/12* (2013.01); *H04L 45/28* (2013.01); *H04W 40/246* (2013.01); *H04W 40/248* (2013.01)

(58) Field of Classification Search
CPC H04W 24/04; H04W 40/246; H04L 41/0668; H04L 45/22
See application file for complete search history.

(56) References Cited

U.S. PATENT DOCUMENTS

| | | | |
|---|---|---|---|
| 2007/0274268 A1 | 11/2007 | Axelsson et al. | |
| 2009/0147673 A1* | 6/2009 | Niigata ................. | G06F 11/201 370/225 |

FOREIGN PATENT DOCUMENTS

| | | |
|---|---|---|
| JP | 2002-9820 | 1/2002 |
| JP | 2007-529135 | 10/2007 |

* cited by examiner

*Primary Examiner* — Siming Liu
(74) *Attorney, Agent, or Firm* — Fujitsu Patent Center

(57) ABSTRACT

A node apparatus that establishes a wireless communication network through wireless communication with other node apparatuses adjacent to the node apparatus includes a memory configured to store node alive-or-dead information, which represents whether or not a node apparatus is in an abnormal state, a controller configured to perform processes including receiving a data frame, performing determination regarding an alive-or-dead state for a transmission destination node apparatus obtained from the data frame on the basis of the node alive-or-dead information stored in the memory, and determining a destination of the data frame from a transmission destination node apparatus obtained from the data frame and a transmission source node apparatus obtained from the data frame on the basis of a result of the determination, and a transmission unit configured to transmit the data frame in which the determined destination is set.

15 Claims, 30 Drawing Sheets

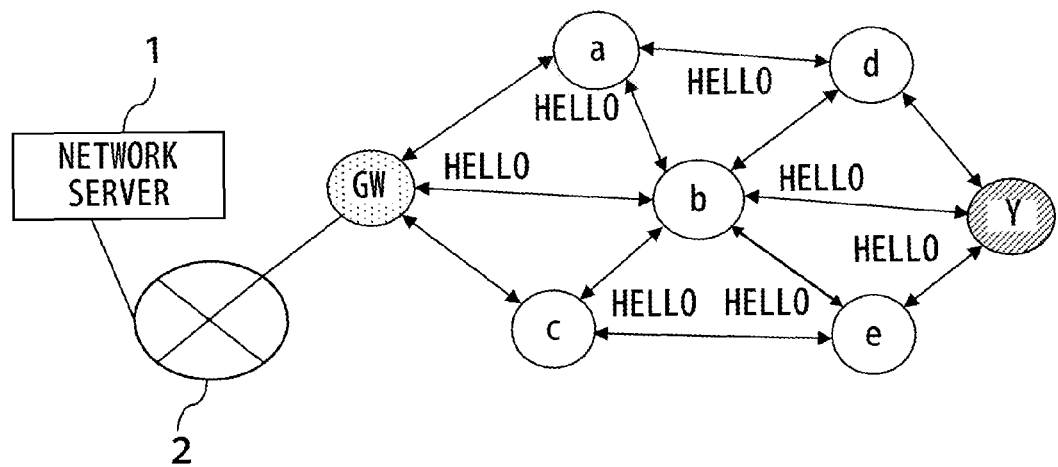
F I G. 1

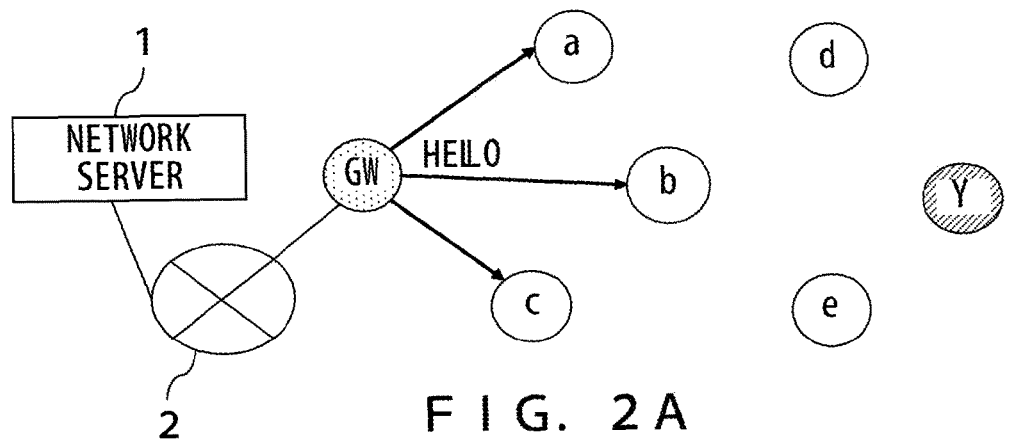
F I G. 2A
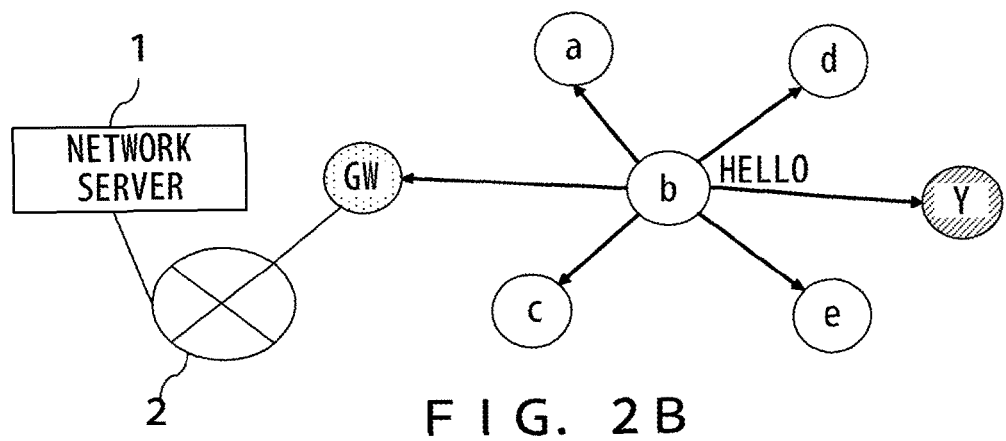
F I G. 2B
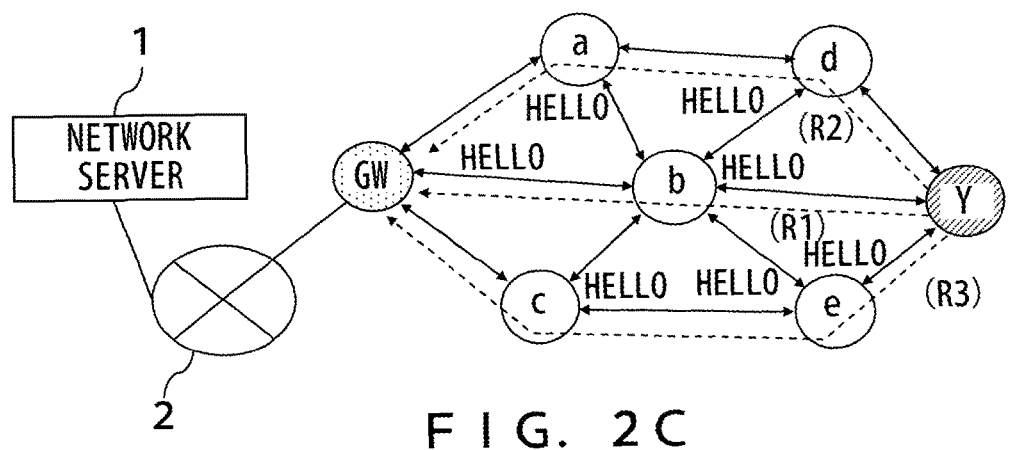
F I G. 2C

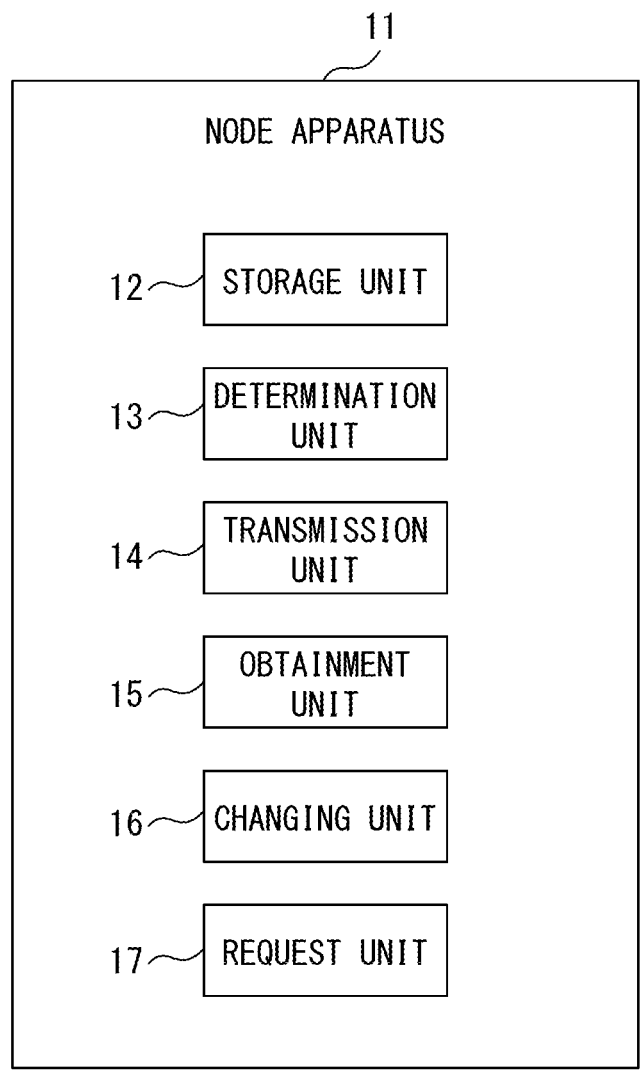
F I G. 4

| | | | | | | |
|---|---|---|---|---|---|---|
|(1)| LD:D | LS:F | GD:X | GS:F | TRANSMISSION FAILURE FLAG=OFF | DATA |
|(2)| LD:A | LS:D | GD:X | GS:F | TRANSMISSION FAILURE FLAG=OFF | DATA |

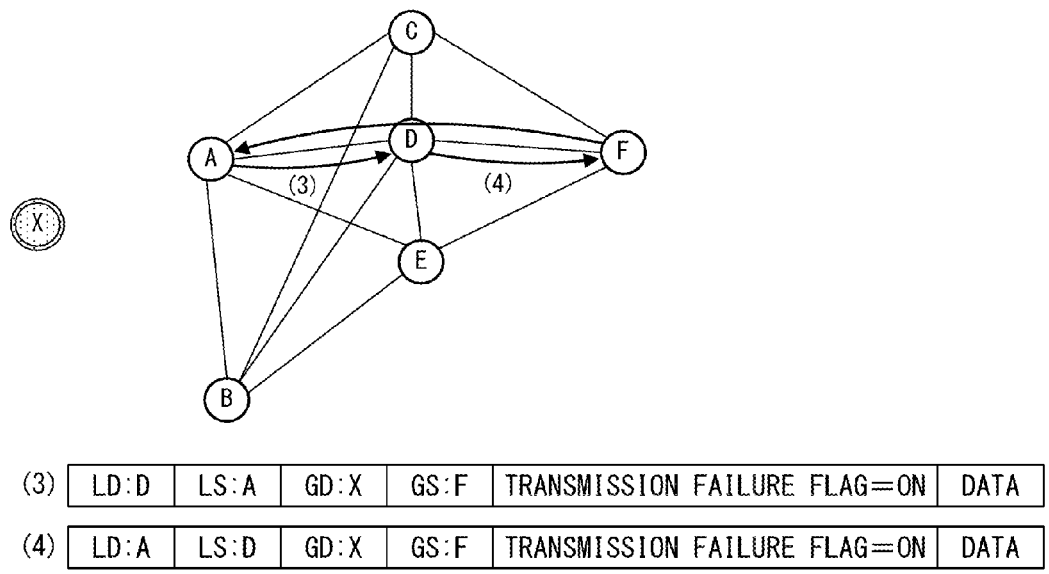
| (3) | LD:D | LS:A | GD:X | GS:F | TRANSMISSION FAILURE FLAG=ON | DATA |
| --- | --- | --- | --- | --- | --- | --- |
| (4) | LD:A | LS:D | GD:X | GS:F | TRANSMISSION FAILURE FLAG=ON | DATA |
F I G. 1 2

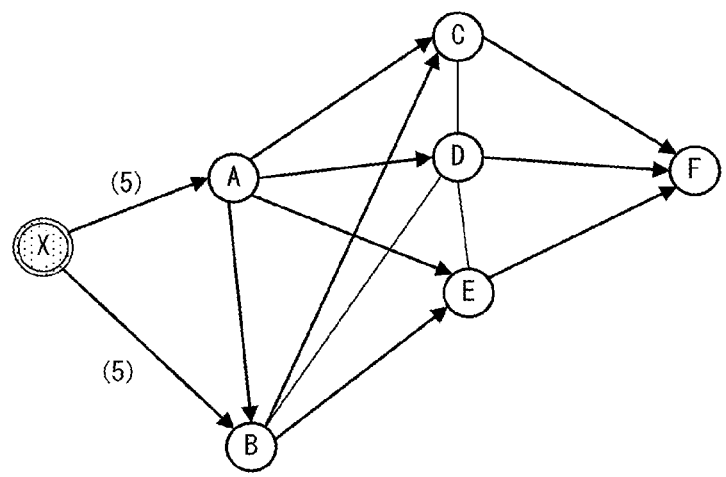
| (5) | LD:FF | LS:X | GD:FF | GS:X | ALIVE-OR-DEAD MONITORING ABNORMALITY FLAG OFF REQUEST |
F I G. 13

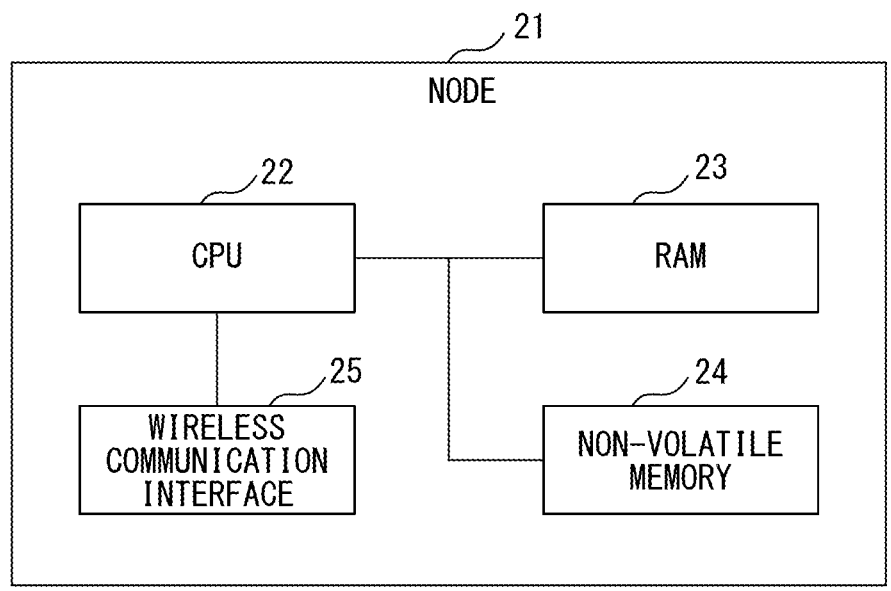
F I G. 1 4

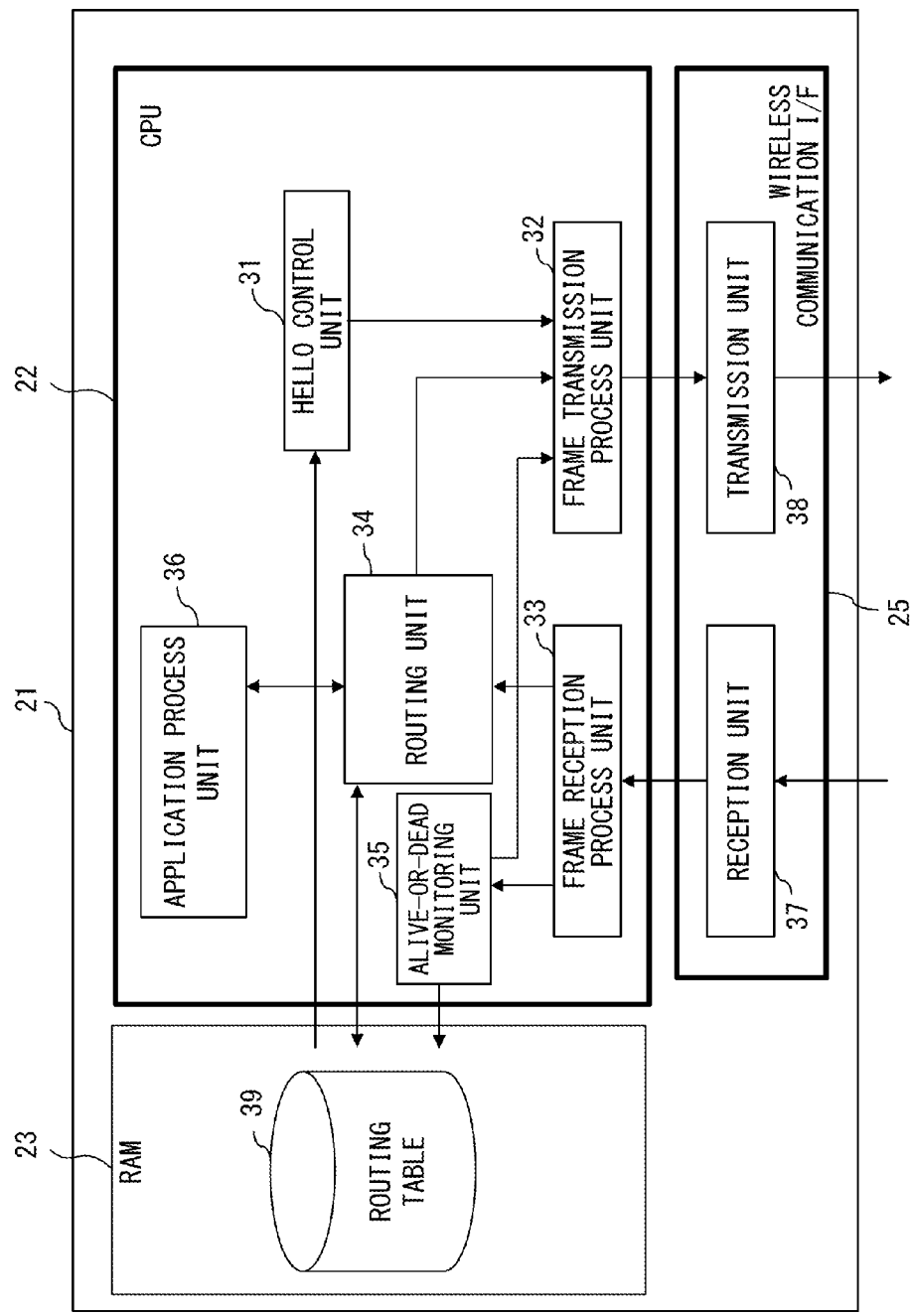
F I G. 15

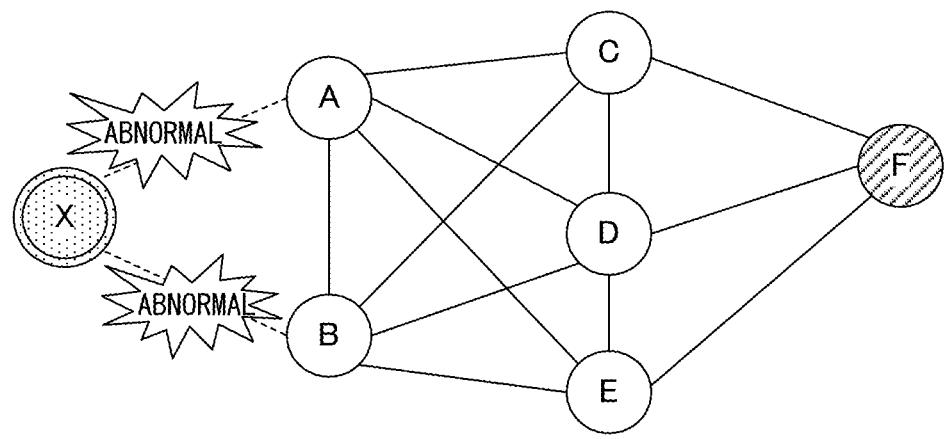
F I G. 17

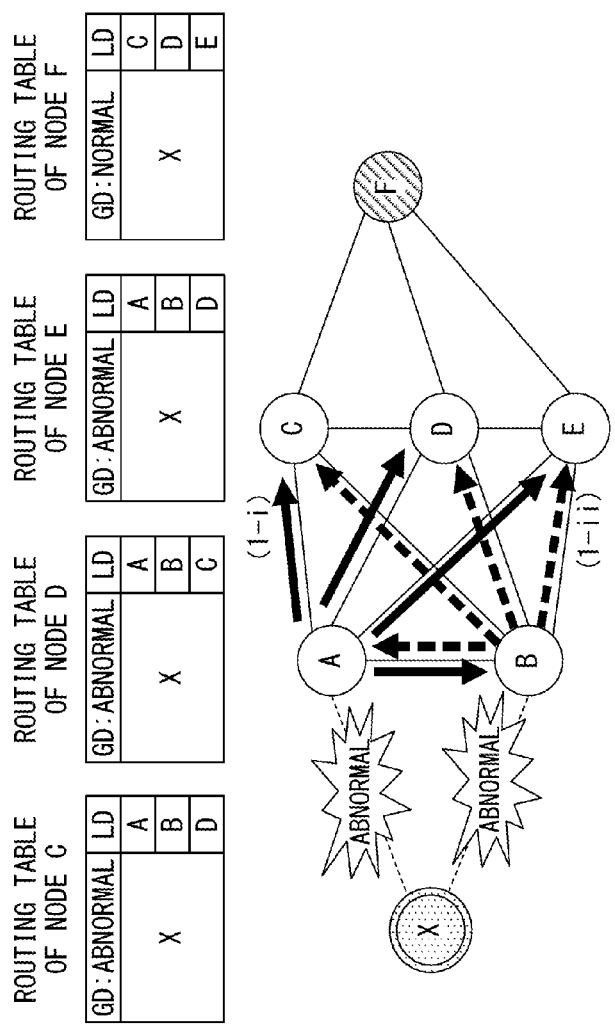
F I G. 1 8

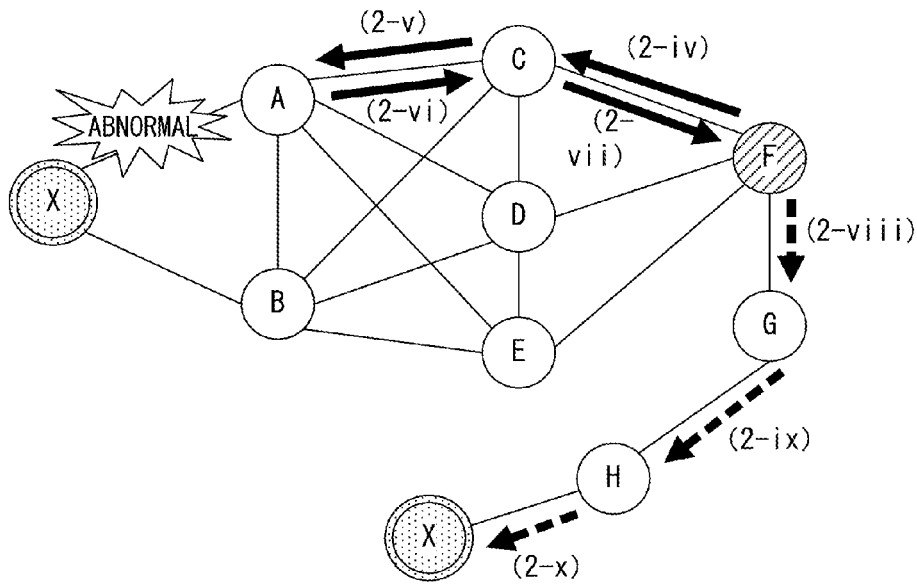
F I G. 21

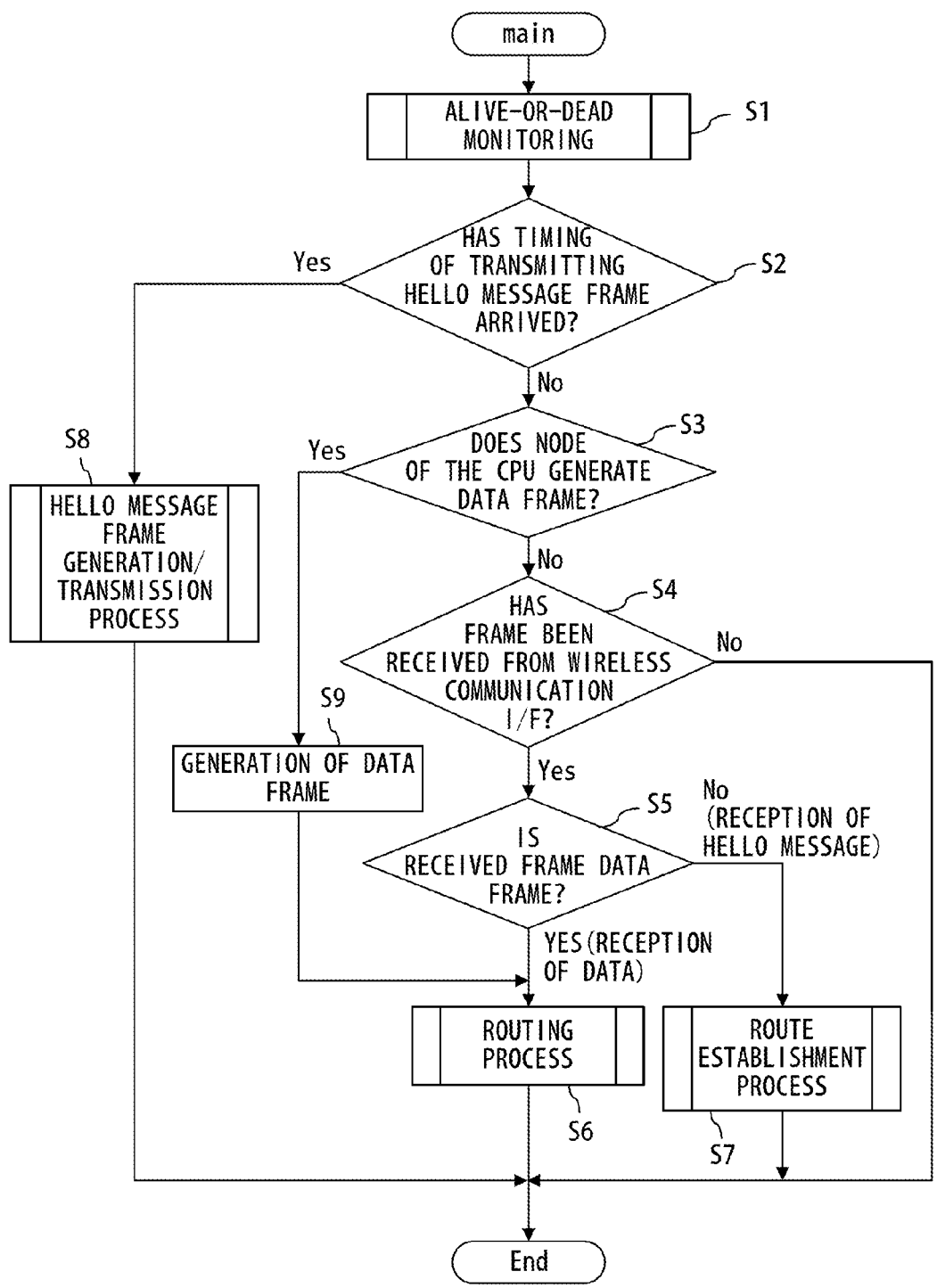
F I G. 25

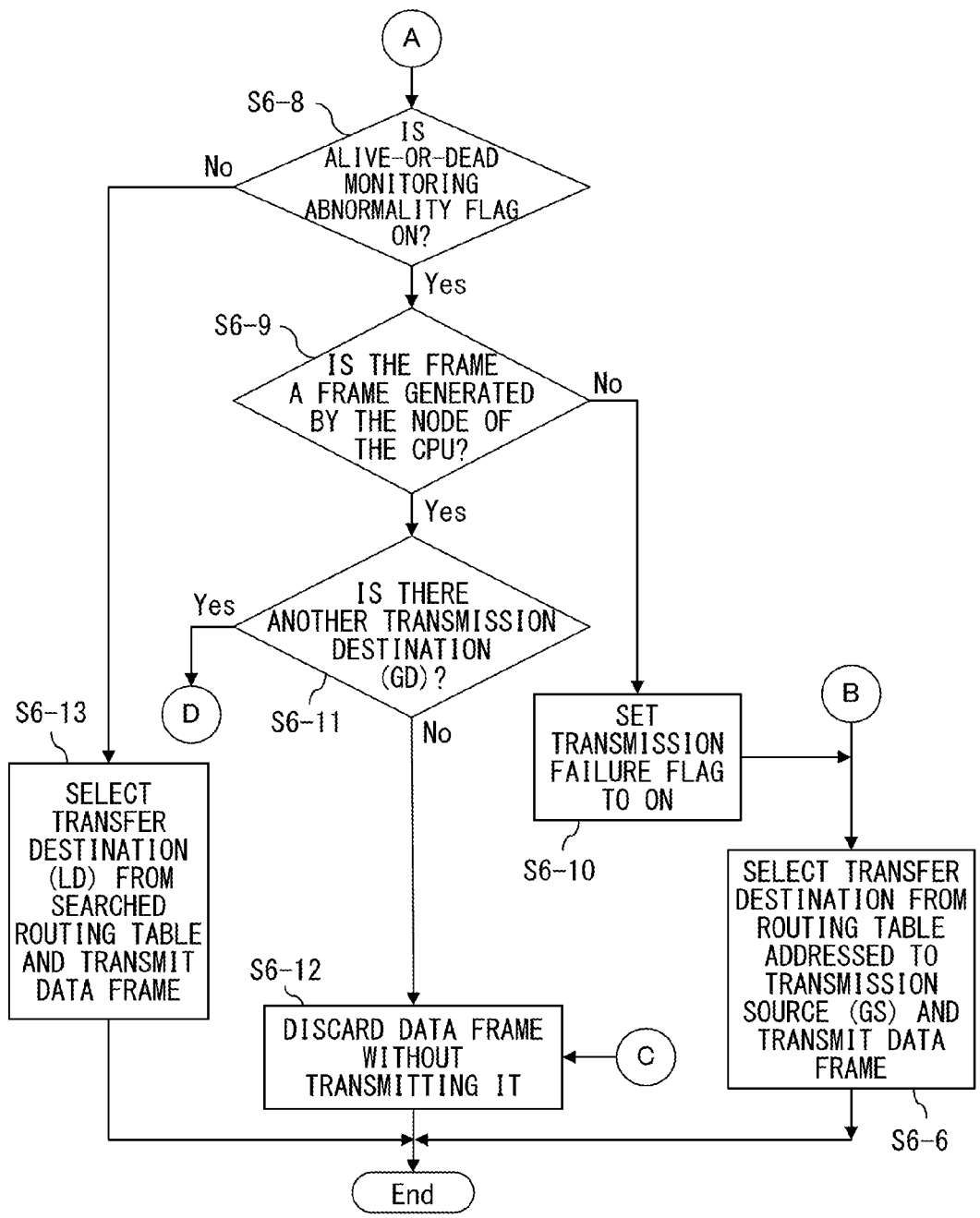
F I G. 28B

NODE APPARATUS, RECORDING MEDIUM THAT HAS STORED CONTROL PROGRAM THEREIN, AND METHOD OF OPERATING NODE APPARATUS

CROSS-REFERENCE TO RELATED APPLICATION

This application is based upon and claims the benefit of priority of the prior Japanese Patent Application No. 2013-237089, filed on Nov. 15, 2013, the entire contents of which are incorporated herein by reference.

FIELD

The embodiments discussed herein are related to a node apparatus that establishes a wireless communication network through wireless communication between node apparatuses that are adjacent to each other.

BACKGROUND

Ad hoc communication techniques are communication techniques in which devices perform communications directly with each other without access points. In recent years, the wireless ad hoc network technique, in which each communication device to which an ad hoc communication technique has been applied recognizes communication devices around it, has been gaining attention.

As an example of a routing protocol of an ad hoc network (ad hoc protocol), there is a reactive-type AODV (Ad hoc On-Demand Distance Vector Algorithm) and a proactive-type OLSR (Optimized Link State Routing). As an example of a proactive-type routing protocol, there is a protocol in which each node autonomously establishes a route for performing data communications prior to communication requests and further learns appropriate routes on an as-needed basis so as to change routes.

As an example of a technique related to an ad hoc network, there is a first technique related to a system that performs routing in a multiple-hop wireless communication network including a plurality of network nodes (for example, Patent Document 1). This system includes a unit that obtains quality information representing a link state between the infrastructure and nodes, a unit that uses link quality information in a route determination process in an infrastructure/node that uses prediction procedures, and a routing unit that transmits a data packet through the determined route. Link quality information includes information about a link state that changes temporally. A prediction procedure uses information about a link state that changes temporally in a prediction procedure.

Also, as an example of a communication failure route avoidance technique in a network system, there is a second technique that suppresses packets transmitted from a route selection device (for example, Patent Document 2). According to the second technique, when a destination-inaccessibility report (ICMP message) has been received from an adjacent route selection device that detected the occurrence of a failure in a specified route, the adjacent route selection device performs the following processes. Specifically, the adjacent route selection device switches routing destination adjacent route selection devices and updates a database of a link state corresponding to the network loads, and suppresses transmitted IP packets on the basis of the traffic information in the current adjacent route selection device.

Patent Document 1: Japanese National Publication of International Patent Application No. 2007-529135
Patent Document 2: Japanese Laid-open Patent Publication No. 2002-9820

SUMMARY

A node apparatus, according to one aspect of the embodiments, that establishes a wireless communication network through wireless communication with other node apparatuses adjacent to the node apparatus includes a memory, a controller and a transmission unit. The memory is configured to store node alive-or-dead information, which represents whether or not a node apparatus is in an abnormal state. The controller is configured to perform processes including receiving a data frame, performing determination regarding an alive-or-dead state for a transmission destination node apparatus obtained from the data frame on the basis of the node alive-or-dead information stored in the memory, and determining a destination of the data frame from a transmission destination node apparatus obtained from the data frame and a transmission source node apparatus obtained from the data frame on the basis of a result of the determination. The transmission unit is configured to transmit the data frame in which the determined destination is set.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 shows an example of a configuration of a meshed ad hoc network;

FIG. 2A through FIG. 2C show an example in which node (Y) shown in FIG. 1 establishes a route to a gateway (GW) that is the final destination by propagating a HELLO message;

FIG. 4 shows an example of a node apparatus according to the present embodiment;

FIG. 12 explains routing, according to the present embodiment, of a data frame that was transmitted to a node in an alive-or-dead monitoring abnormality state before a HELLO message frame with an alive-or-dead monitoring abnormality flag ON is delivered (third);

FIG. 13 explains operations, according to the present embodiment, of propagating to all nodes in an ad hoc network a request that alive-or-dead monitoring abnormality information about node X be cleared;

FIG. 14 shows a hardware configuration example of a node according to the present embodiment;

FIG. 15 shows an example of a functional block diagram of a node related to frame transmission and reception according to the present embodiment;

FIG. 17 explains propagation procedures of a report of alive-or-dead monitoring abnormality in the present embodiment (example 1) (second);

FIG. 18 explains propagation procedures of a report of alive-or-dead monitoring abnormality in the present embodiment (example 1) (third);

FIG. 21 shows a flow of a data frame in a case where a data frame addressed to node X has been transmitted from node X in a state that node A has detected alive-or-dead monitoring abnormality in node X and the abnormality detection has not been reported to node C or node F in the present embodiment (example 2);

FIG. 25 shows a flow of the entire process of a node according to the present embodiment (examples 1 through 3);

FIGS. 28A and 28B are a detailed flow of a routing process (S6) according to the present embodiment.

DESCRIPTION OF EMBODIMENTS

Figure 3A:
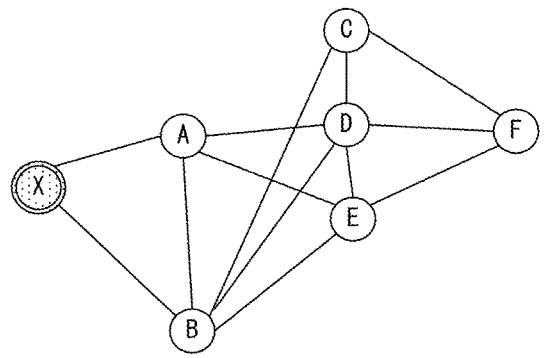
FIG. 3A through FIG. 3C explain confused states of an ad hoc network when alive-or-dead monitoring has detected abnormality.

When a node apparatus that is a transmission destination of a data frame has failed in an ad hoc network, there is a possibility that the data frame will loop between nodes adjacent to the failed node and that such a looping data frame will be discarded as an abnormal frame by a node that has detected the abnormality.

As one aspect, the present embodiments provide a technique of controlling the routing of a data frame in an ad hoc network on the basis of the alive-or-dead state of a node apparatus.

Hereinafter, detailed explanations will be given for the present embodiments by referring to the drawings. First, the terms used herein will be explained.

"Frame" refers to a unit of data to be treated by a protocol. "Frame" includes for example a "HELLO message frame" and a "data frame"; however, the scope of the embodiments are not limited to these examples.

A "HELLO message frame" is a type of a control frame for communicating control information, and refers to a special frame that is transmitted by a node apparatus to another node apparatus for the confirmation of the existence and the state of each other. Note that a HELLO message frame may simply be referred to as a HELLO message in some cases.

"Data frame" refers to data that is to be transmitted through a network (from a starting node to a goal node). As a matter of course, a node apparatus may include a unit that is appropriate for identifying a "hello frame" and a "data frame".

"Local Destination (LD)" refers to a destination node ID representing an adjacent node apparatus to which a frame is to be delivered next. In this document, an LD may sometimes be referred to as a "local destination address".

"Local Source (LS)" refers to a node ID representing a node apparatus serving as a transmission source that actually transmits a frame to an LD. In this document, an LS may sometimes be referred to as a "local source address".

"Global Destination (GD)" refers to a node ID that is the final destination of a series of propagation of a data frame across networks. In this document, a GD may sometimes be referred to as a "global destination address".

"Global Source (GS)" refers to a node ID that is the first transmission source of a series of propagation of a data frame across networks. In this document, a GS may sometimes be referred to as a "global source address".

FIG. 1 shows an example of a configuration of a meshed ad hoc network. A network server 1 and a layer 3 (L3) network gateway node apparatus (GW) are connected to an L3 network 2. A GW is a device that relays connections between networks, and performs conversion between pieces of data based on different protocols so as to relay these pieces of data. In FIG. 1 for example, the GW performs conversion between the communication protocol used in L3 and the ad hoc protocol in order to realize communications.

Node apparatuses (referred to as nodes hereinafter) a through e and Y are communication terminals based on a wireless ad hoc communication technique. Each node periodically transmits to and receives from adjacent nodes messages (HELLO messages) including route information and node information such as communication quality information of inter-node links, etc. Thereby, a node calculates the communication quality of each route on the basis of information in a HELLO message and performs the establishment of a plurality of routes to the final destination and the confirmation of the optimum route.

Also, each node exchanges histories of actual data communications and periodical messages (HELLO messages) with adjacent nodes about the established route. Then, the node maintains routes and learns the optimum route so as to perform changes of routes on an as-needed basis on the basis of the result of recalculating (updating) the communication quality of each route.

FIG. 2A through FIG. 2C show an example in which node (Y) shown in FIG. 1 establishes a route to a gateway (GW) that is the final destination by propagating a HELLO message.

First, the GW performs broadcast transmission of a HELLO message including node information (route information/communication quality information of inter-node link) held by the GW itself when timing of transmitting the HELLO message of the GW has arrived. Adjacent nodes a, b and c receive HELLO messages from the GW (FIG. 2A).

When nodes a, b and c have received the HELLO messages from the GW, they register the GW in the route information tables (routing tables), respectively. Also, nodes a, b and c use the node information, held by the GW, that was included in the HELLO messages from the GW so as to calculate the communication quality of inter-node link and route quality. Nodes a, b and c register the calculation results in the route information tables (routing tables) and the link information tables (link tables). Note that nodes a, b or c do not perform re-broadcast (flooding) of HELLO messages received from the GW.

Next, in the case of for example node b, node b broadcasts a HELLO message including node information held by node b when timing of transmitting a HELLO message of node b has arrived (FIG. 2B). A HELLO message of node b includes information of the GW and other nodes.

Node Y receives a HELLO message from node b and registers node b in the route information table. Also, node Y registers that fact that the route to the GW is via node b and the calculation result of that route quality/link quality in the routing table/link table.

Similarly to node b, nodes d and e also perform broadcast transmission of HELLO messages when timings of transmitting their respective HELLO messages have arrived. In node Y, a plurality of routes (R1) through (R3) treating nodes b, d and e as next transfer candidates are established as routes addressed to the GW and the optimum route to the final destination (GW) is confirmed by the route quality/link quality information in each route (FIG. 2C).

As described above, each node exchanges HELLO messages so that route information/quality information is propagated between the nodes and thereby a plurality of routes to a final destination are established in each node.

As described above, there are usually a plurality of routes in an ad hoc network. Accordingly, even when a route to a final destination is disconnected due to abnormality or the like in a node on that route, data can be delivered to the final destination by changing to another route for transmission.

When for example there is an optimum route (R1) (Y→b→GW) and abnormality occurred in node b and node b has become unable to transfer data, node Y performs the following processes. Specifically, node Y transmits data by switching the route to route (R2) (Y→d→a→GW) or to route (R3) (Y→e→c→GW). Thereby, it is possible to deliver data to the GW, which is the final destination.

Further, HELLO messages are exchanged periodically between nodes and route information and inter-node link quality information held by respective nodes are exchanged and propagated. Thereby, each node exchanges HELLO messages so as to perform communication quality recalculation (updating) of an inter-node link, maintains communication routes, learns the optimum route, and changes route information on an as-needed basis. Also, a node performs alive-or-dead monitoring, which determines whether or not a partner node is operating normally (normal condition) or is not operating (abnormal condition). Hereinafter, the state of a node that has been determined to be abnormal as a result of alive-or-dead monitoring based on exchanges of HELLO messages is referred to as "alive-or-dead monitoring abnormality" or "alive-or-dead monitoring abnormal state".

However, in the above method, a node in which alive-or-dead monitoring has detected abnormality and nodes in which abnormality has not been detected exist in a mixed manner under a situation where abnormality has been detected as a result of alive-or-dead monitoring based on exchanges of HELLO messages but information reporting the abnormality has not entirely propagated all over the ad hoc network. In such a case, there is a high possibility that normal communication routes will not be established and communication fails such as in a case, among other cases, where a frame being transferred is determined to be an abnormal frame during the transfer and is discarded.

Particularly when a GW has become alive-or-dead monitoring abnormal state immediately before an event of transferring data (for example periodical communication) to the network server 1 via that GW, there is a possibility that the following events will occur. Specifically, there is a possibility that a data frame will wander in the ad hoc network, resulting in higher traffic and in some cases the frame data fails to reach the sever. Accordingly, the entire system is influenced significantly. This will be explained by referring to FIG. 3.

Figure 3B:
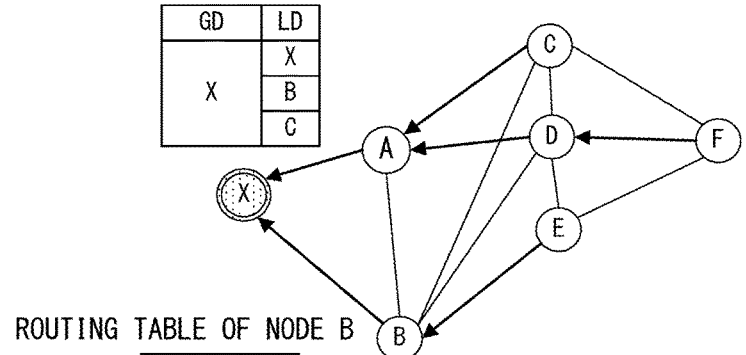
Figure 3C:
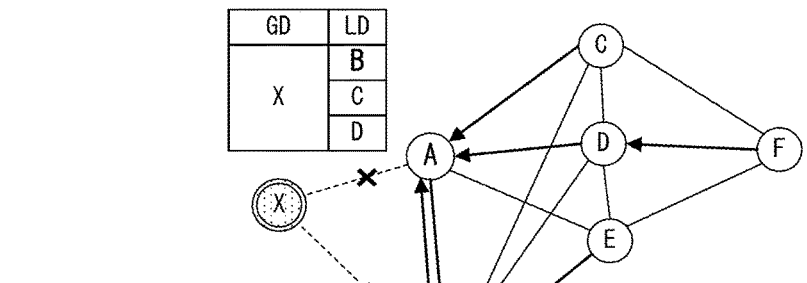

FIG. 3A through FIG. 3C explain confused states of an ad hoc network when alive-or-dead monitoring has detected abnormality. FIG. 3A shows a route example of an ad hoc network related to nodes A through F and X. Also, in the routing tables shown in FIGS. 3B and 3C, "GD" represents a global destination address and "LD" represents a local destination address. LD stores a prescribed number (three in this example, i.e., first candidate (LD1), second candidate (LD2) and third candidate (LD3)) of routes in the order starting from the highest reception strength (or communication quality) among a plurality of routes to the local destination node in a GD unit.

In FIG. 3B, routes addressed to first candidate (LD1) are depicted by arrows among routes from each node to node X. In the state shown in FIG. 3B, when node A and node B respectively have detected abnormality in node X i.e., the communication impossibility by alive-or-dead monitoring, routes are changed automatically as shown in FIG. 3C. In other words, as a result of a HELLO message not being received from node X, node B, which transmitted a HELLO message with the best communication quality at that moment becomes the first candidate (LD1) in the routing table of node A. Also, in the routing table of node B, node A, which transmitted the HELLO message with the best communication quality at that moment becomes the first candidate (LD1).

As described above, because nodes A and B have detected alive-or-dead monitoring abnormality in node X, LD1=node X, which has been the first candidate until that time, is changed to LD1=node B and LD1=node A, respectively. This leads to a situation where nodes A and B misunderstand that they are the optimum routes to each other. Further, nodes C, D, E or F has not detected alive-or-dead monitoring abnormality, and accordingly nodes A and B remains set as the optimum routes.

When communication to node X is attempted, looping occurs between nodes A and B, leading to a possibility that frames will be lost.

As described above, when data is transmitted to a node detected as involving alive-or-dead monitoring abnormality in an ad hoc network including a node having detected the alive-or-dead monitoring abnormality and nodes not having detected the alive-or-dead monitoring abnormality, frames loop in the network. Because of this, there is a demand that a transferring node having detected a frame that is looping (loop frame) be prevented from discarding that frame as an abnormal frame.

Also, by discarding a frame, the transmission source node regards the transmission as being completed in spite of that the frame has not been delivered to the destination. In such a case, it is demanded that destination switching be performed in the transmission source node, which is performed in a case where transmission to the final destination has failed.

Also, a transferring node revises route quality each time it transfers a loop frame, breaking the optimum route that has worked before that. Accordingly, it is demanded that an optimum route be prevented from being broken each time a loop frame is transferred.

FIG. 4 shows an example of a node apparatus according to the present embodiment. A node apparatus 11 establishes a wireless communication network by performing wireless communications between adjacent node apparatuses. A node apparatus includes a storage unit 12, a determination unit 13 and a transmission unit 14.

The storage unit 12 stores node alive-or-dead information, which represents whether or not a node is in an abnormal state. An example of the storage unit 12 is a routing table 39 or a RAM 23 that stores the routing table 39.

The determination unit 13 receives a data frame and performs determination regarding an alive-or-dead state of a transmission source node apparatus that has been obtained from a data frame, on the basis of node alive-or-dead information recorded in the storage unit 12. The determination unit 13 determines the destination of a data frame from a transmission destination node apparatus obtained from the data frame and a transmission source node apparatus obtained from the data frame on the basis of the result of the determination. An example of the determination unit 13 is a routing unit 34.

The transmission unit 14 transmits a data frame in which the determined destination has been set. An example of the transmission unit 14 is a frame transmission process unit 32.

By employing the above configuration, it is possible to control routing of a data frame in an ad hoc network on the basis of the alive-or-dead state of a node apparatus.

The node apparatus 11 further includes an obtainment unit 15. The obtainment unit 15 obtains node alive-or-dead information about a node apparatus adjacent to the node apparatus of the obtainment unit 15 itself or a node apparatus that is not adjacent to the node apparatus of the obtainment unit 15 itself. An example of the obtainment unit 15 is an alive-or-dead monitoring unit 35.

By employing the above configuration, each node can obtain alive-or-dead information of other nodes in an ad hoc network.

The transmission unit 14 further transmits, to a node apparatus that is adjacent to the node owning the transmission unit 14, node alive-or-dead information about a node apparatus adjacent to the node owning the transmission unit 14 itself or node alive-or-dead information about a node apparatus not adjacent to the node apparatus owning the transmission unit 14 itself.

By the above configuration, it is possible to propagate alive-or-dead information about a node in which abnormality occurred to the entire ad hoc network.

When the determination unit 13 determines a node apparatus of the transmission source obtained from a data frame as the destination of a data frame on the basis of the result of determination, the determination unit 13 adds, to the data frame, transmission failure information that represents a failure of the transmission to the transmission destination obtained from a data frame.

By employing the above configuration, it is possible to report, to a transmission source, a failure of the transmission of a data frame.

A node apparatus further includes a changing unit 16. The changing unit 16 changes the destination of a data frame to a different node apparatus when the changing unit 16 has received a data frame which is a data frame generated and transmitted by the node apparatus owning the changing unit 16 itself and to which transmission failure information has been added. An example of the changing unit 16 is a routing unit 34.

By employing the above configuration, it is possible to perform transmission to a different node that is registered beforehand when transmission to a transmission destination has failed.

Anode apparatus further includes a request unit 17. The request unit 17 transmits to an adjacent node apparatus a request that the node alive-or-dead information about anode apparatus having recovered from an abnormal state be changed from an abnormal state to a normal state. An example of the request unit 17 is the alive-or-dead monitoring unit 35.

Figure 5:
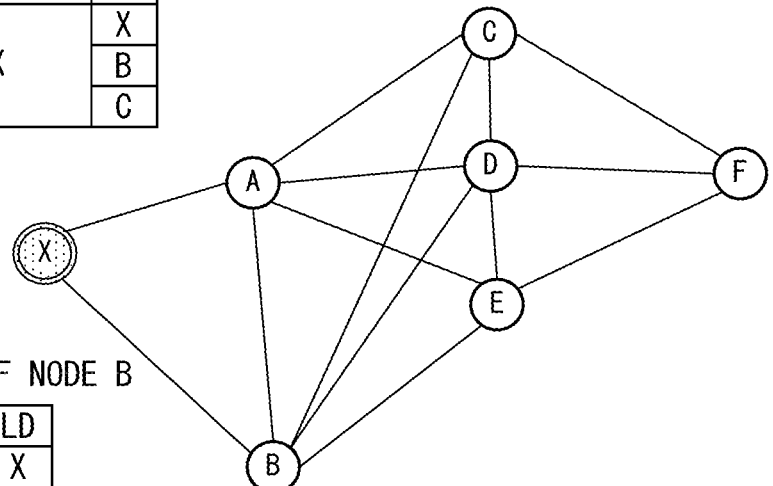
FIG. 5 explains operations of propagating alive-or-dead monitoring abnormality information about node X to all nodes in an ad hoc network according to the present embodiment (first)
Figure 6:
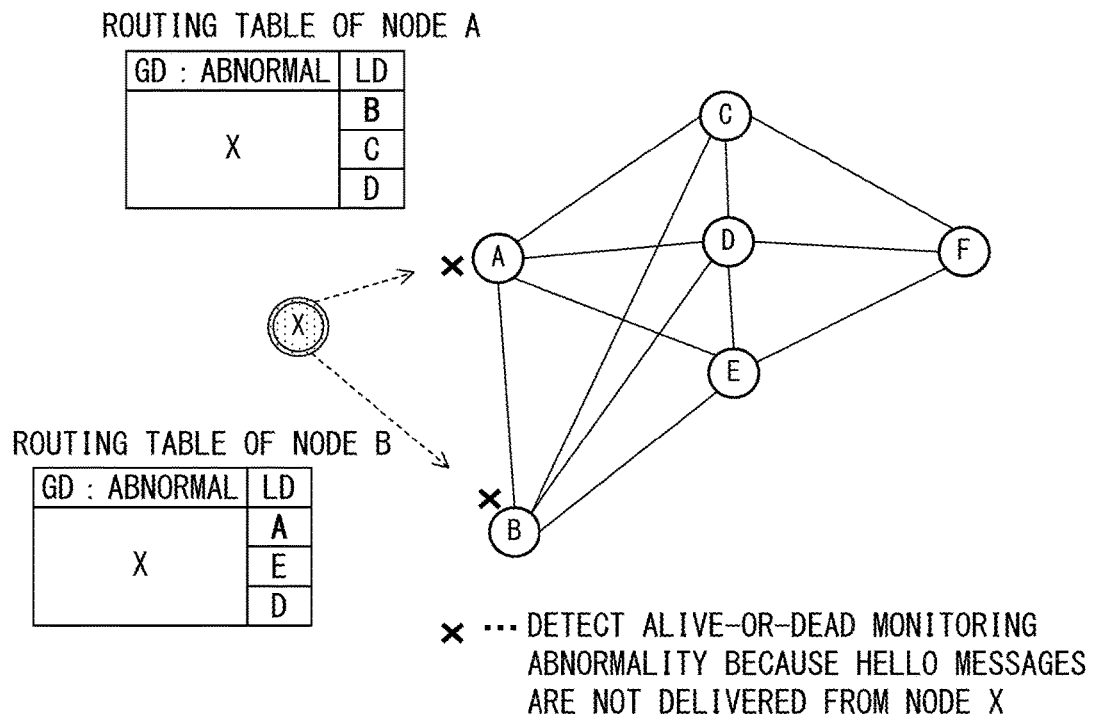
FIG. 6 explains operations of propagating alive-or-dead monitoring abnormality information about node X to all nodes in an ad hoc network according to the present embodiment (second)

FIG. 5 through FIG. 13 explain operations of an ad hoc network according to the present embodiment. FIG. 5 through FIG. 9 explain operations of propagating alive-or-dead monitoring abnormality information about node X to the entire ad hoc network according to the present embodiment. For example, the network shown in FIG. 5 is assumed as an example of a configuration of an ad hoc network under normal condition.

At this moment, node X is operating normally. Hereinafter, the addresses of nodes X, A, B, C, . . . are represented by node ID=X, A, B, C, . . . . Also, each node includes a routing table that holds rout information for an adjacent node that is managed in units of final destination node (GD).

Regarding a routing table for GD=X included in node A, nodes X, B and C are stored as the first through third candidates in LD.

Regarding a routing table for GD=X included in node B, nodes X, A and E are stored as the first through third candidates in LD.

Also, "GD: normal" in a routing table represents that alive-or-dead monitoring abnormality flag=OFF i.e., the node registered as a GD is operating normally.

Next, it is assumed that abnormality has occurred in node X. In such a case, nodes A and B detect the alive-or-dead monitoring abnormality in node X because HELLO messages are not delivered from node X. When nodes A and B have detected the alive-or-dead monitoring abnormality in node X, which is the final destination (GD), the nodes A and B revise the routes of the first through third candidates of the LD, and turns on the alive-or-dead monitoring abnormality flag (=abnormality) in routing information addressed to node X in the routing table. As a result of the revise of the routes, the first candidate (LD1) in the routing table addressed to X (GD) included in node A is changed to "B" and the first candidate (LD1) in the routing table addressed to X (GD) included in node B is changed to "A".

Figure 7:
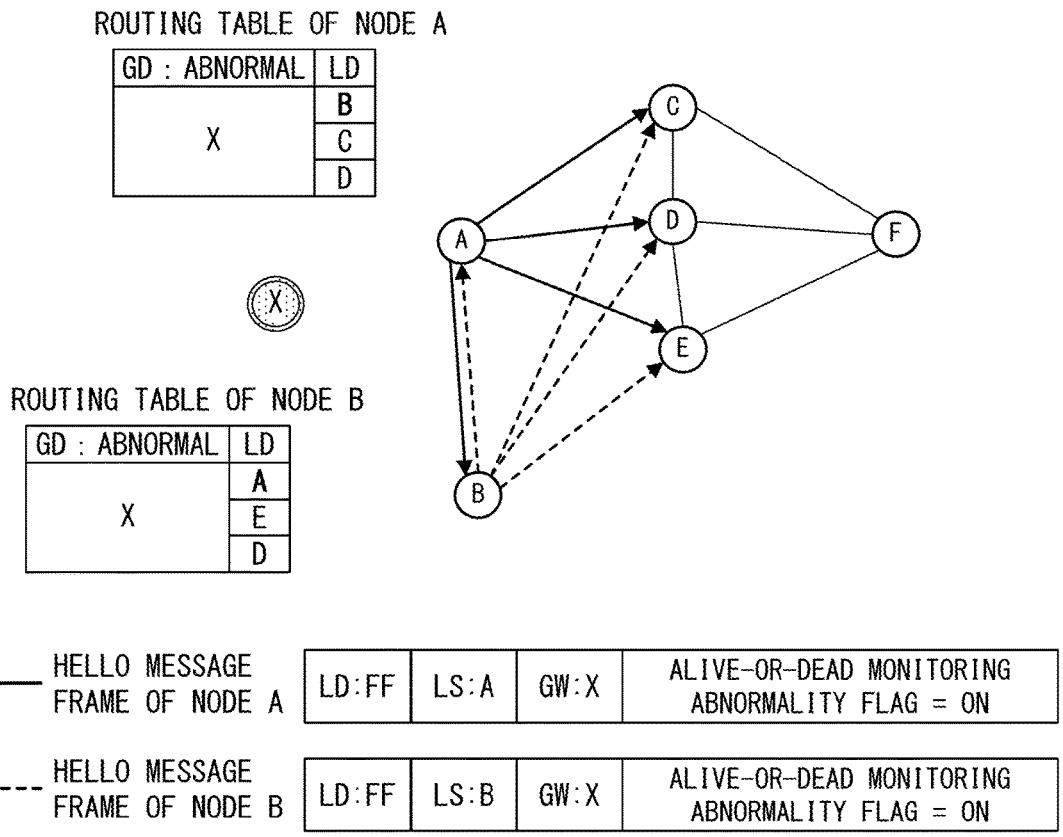
FIG. 7 explains operations of propagating alive-or-dead monitoring abnormality information about node X to all nodes in an ad hoc network according to the present embodiment (third)

Then, as shown in FIG. 7, nodes A and B set the bits representing the abnormality in node X to ON (alive-or-dead monitoring abnormality flag=ON) in HELLO message frames to be transmitted by the nodes A and B and broadcast the HELLO message frames. In FIG. 7, the arrows drawn by solid lines represent the transmission of HELLO messages by node A. The arrows drawn by dashed lines represent transmission of HELLO messages by node B.

Figure 8:
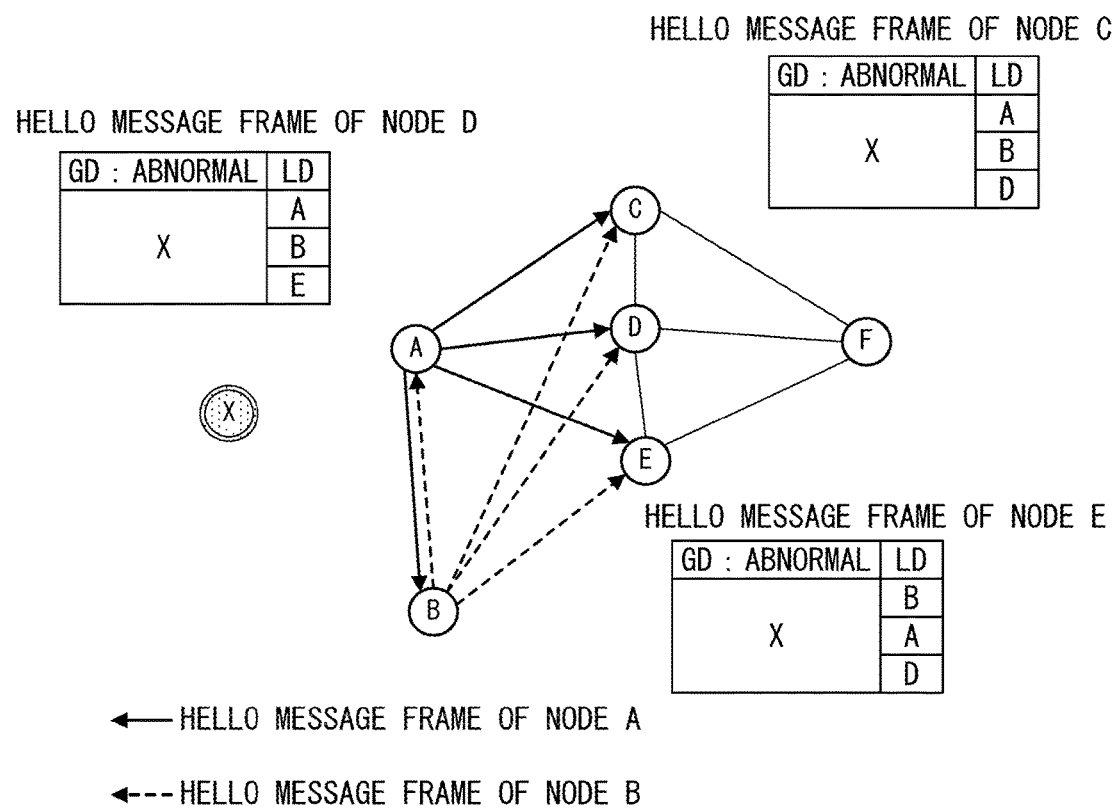
FIG. 8 explains operations of propagating alive-or-dead monitoring abnormality information about node X to all nodes in an ad hoc network according to the present embodiment (fourth)

Next, as shown in FIG. 8, when nodes C, D and E have received HELLO message frames in which the alive-or-dead monitoring abnormality flags for node X are ON, the nodes C, D and E set to ON (=abnormality) the "alive-or-dead monitoring abnormality flags" in the route information addressed to node X in the routing tables.

Figure 9:
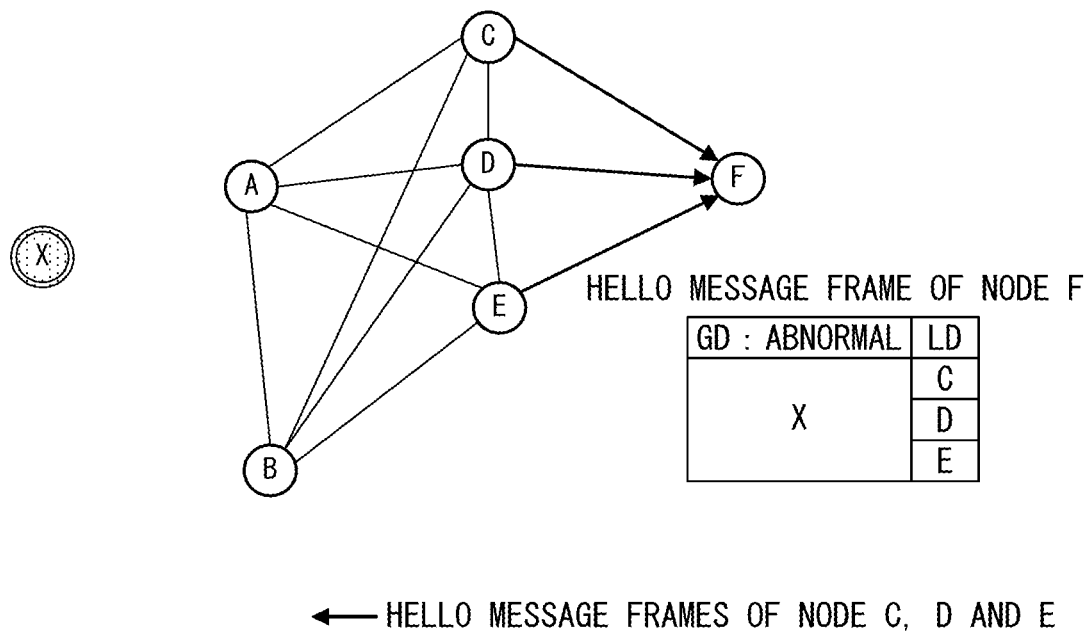
FIG. 9 explains operations of propagating alive-or-dead monitoring abnormality information about node X to all nodes in an ad hoc network according to the present embodiment (fifth)

Next, as shown in FIG. 9, nodes C, D and E turns ON the bits (alive-or-dead monitoring abnormality flags for node X) representing the abnormality in node X in HELLO message frames and broadcast the HELLO message frames, similarly to nodes A and B explained in FIG. 7.

Receiving a HELLO message frame with the alive-or-dead monitoring abnormality flag ON for node X, node F turns on (=abnormal) the "alive-or-dead monitoring abnormality flag" in the route information addressed to node X in the routing table. Thereby, it is reported that node X is in an alive-or-dead monitoring abnormality state to all nodes in an ad hoc network with HELLO message frames with alive-or-dead monitoring abnormality flags ON having been delivered to node F.

When, for example, timing has arrived for performing periodical communication of node F with node X in the state shown in FIG. 9, node F does not transmit data because the alive-or-dead monitoring abnormality flag for node X is ON. As described above, unnecessary transfer or detour of frames does not occur in an ad hoc network by suppressing data transmission in this manner, making it possible to reduce traffic.

However, there is a case where a data frame is transmitted to a node of alive-or-dead monitoring abnormality before a HELLO message frame with an alive-or-dead monitoring abnormality flag ON is delivered. This will be explained by referring to FIG. 10 through FIG. 12.

Figure 10:
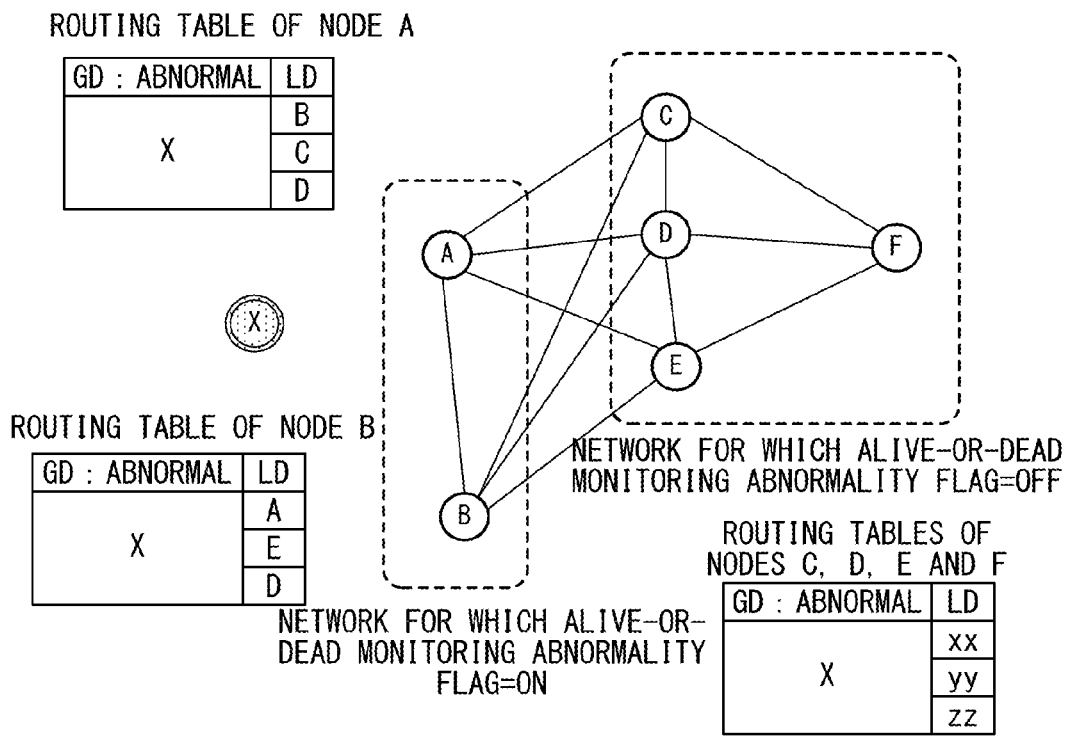
FIG. 10 explains routing, according to the present embodiment, of a data frame that was transmitted to a node in an alive-or-dead monitoring abnormality state before a HELLO message frame with an alive-or-dead monitoring abnormality flag ON is delivered (first)
Figure 11:
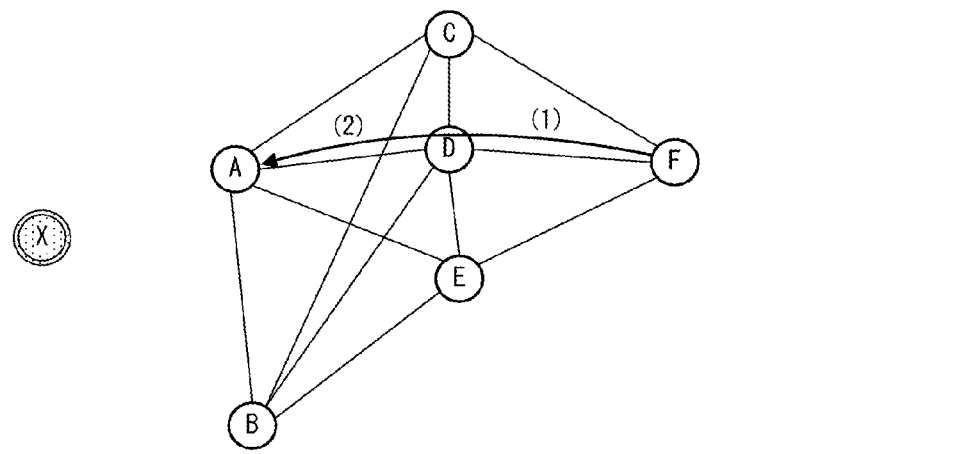
FIG. 11 explains routing, according to the present embodiment, of a data frame that was transmitted to a node in an alive-or-dead monitoring abnormality state before a HELLO message frame with an alive-or-dead monitoring abnormality flag ON is delivered (second)

FIG. 10 through FIG. 12 explain routing, according to the present embodiment, of a data frame that was transmitted to a node in an alive-or-dead monitoring abnormality state before a HELLO message frame with an alive-or-dead monitoring abnormality flag ON is delivered. Before nodes A and B transmit HELLO message frames (FIG. 8), the ad hoc network configuration is for example as shown in FIG. 10. Namely, in the ad hoc network between nodes A and B, the alive-or-dead monitoring abnormality flags are ON in the routing tables in nodes A and B. Also, in the ad hoc networks between nodes C, D, E and F, the alive-or-dead monitoring abnormality flags are OFF in the routing tables in nodes C, D, E and F.

As shown in FIG. 11, in node F, when timing has arrived for performing periodical communication with node X, a data frame is transferred in the order of nodes F, D and A in an ad hoc network with alive-or-dead monitoring abnormality flag OFF. The transmission failure flag for node X in the data frame has been set to OFF.

Explanations will be given for data frames. A data frame includes a header portion and a data portion. The header of a data frame includes "LD", "LS", "GD", "GS" and "transmission failure flag". In "LD", a local destination address is set. In "LS", a local transmission source address is set. In "GD", a global destination address is set. In "GS", a global transmission source address is set. In "transmission failure flag", a flag representing whether or not transmission to a GD has failed is set. The default value of a transmission failure flag is OFF, and when transmission failed, the transmission failure flag is turned ON.

In the header of frame (1) transmitted from node F to node D, "LD:D, LS:F, GD:X, GS:F, transmission failure flag: OFF" is set. In the header of frame (2) transmitted from node D to node A, "LD:A, LS:D, GD:X, GS:F, transmission failure flag:OFF" is set.

In the routing table regarding GD:X included in node A, the alive-or-dead monitoring abnormality flag is ON. In such a case, node A executes the following process when node A has received transfer frame (2) addressed to node X. Specifically, as shown in FIG. 12, node A sets the transmission failure flag to ON because the transmission failure flag of frame header (2) is OFF, rewrites LD and LS of that frame, and returns frame (3) to node D, which is the transmission source.

Node D determines that no frames can reach node X because the transmission failure flag of the received frame is ON, rewrites LD and LS of that frame, and returns frame (4) to node F, which is the transmission source. Node F determines that periodical transmission has failed because frame (1) addressed to node X is retuned with the transmission failure flag having been tuned ON.

Next, a case will be explained by using FIG. 13 where node X has recovered. There is a possibility that a node around node X may have determined node X to be in an alive-or-dead monitoring abnormality state even after the recovery of node X. Accordingly, node X broadcasts a frame of an alive-or-dead monitoring abnormality OFF request in the ad hoc network when node X is reactivated. An alive-or-dead monitoring abnormality OFF request is a command requesting that an alive-or-dead monitoring abnormality flag be updated to OFF when the alive-or-dead monitoring abnormality flag is ON in the routing table of the node having received that request. Receiving an alive-or-dead monitoring abnormality OFF request, each node changes, to OFF, the alive-or-dead monitoring abnormality flag addressed to node X in routing table and performs transfer. Each node repeats this process and thereby can instantly report the recovery of node X in the ad hoc network.

According to the present embodiment, the following is realized in a wireless ad hoc network environment that performs multi hop for periodically delivering information via a GW. Specifically, even in a situation where a node that constitutes an ad hoc network together with a server has entered an alive-or-dead monitoring abnormality state and nodes that detected the abnormality and nodes that did not detected the abnormality exit in a mixed manner, it is possible to suppress the transmission of a frame that causes confusion in the network. Also, even in a case where a frame that causes network confusion has been transmitted, it is possible to return such a frame to the transmission source without causing transfer/detour, which leads to unnecessary traffic.

Hereinafter, examples of the present embodiment will be explained.

FIG. 14 shows a hardware configuration example of a node according to the present embodiment. Anode 21 includes a Central Processing Unit (CPU) 22, a Random Access Memory (RAM) 23, a non-volatile memory 24 and a wireless communication interface 25. The CPU 22 is connected to the RAM. 23, the non-volatile memory 24 and wireless communication interface 25 via a prescribed bus.

The CPU 22 performs various calculation processes. The CPU 22 reads a program that implements a process, which will be explained later, stored in the non-volatile memory 24 or the like and executes that program. A non-volatile memory is a semiconductor memory such as for example a Read Only Memory (ROM), a readable/writable Solid State Drive (SSD), or the like. The RAM 23 is a volatile memory that holds data temporarily.

The wireless communication interface 25 is hardware that executes a process of wireless LAN (Local Area Network) connection. The wireless communication interface 25 includes for example an antenna, an Analog-to-Digital Converter (ADC), a Digital-to-Analog Converter (DAC), a modulator, a demodulator, etc.

Anode also includes a rechargeable battery serving as a power source that provides power to the above electronic elements and makes them operate. Also, the node 21 includes a clock or a timer for clocking although this is not shown.

A program implementing a process in an embodiment that will be explained later may be stored by a program provider side in a storage device such as for example the non-volatile memory 24 etc. via a communication network. Also, a program that implements a process in an embodiment that will be described later may be stored in a commercially-available portable storage medium. In such a case, that portable storage medium may be set in a reading device and the program may be read and executed by the CPU 22.

FIG. 15 is an example of a functional block diagram of a node regarding transmission and reception of frames in the present embodiment. In FIG. 15, the node 21 includes the CPU 22, the wireless communication interface (the wireless communication I/F) 25, and the RAM 23. The RAM 23 stores the route information table (also referred to as a routing table) 39, a link information table (also referred to as a link table), etc.

The wireless communication I/F 25 includes a reception unit 37 and a transmission unit 38, and performs a process of communications with other nodes. The reception unit 37 receives a signal of a frame transmitted to the node 21 and outputs the received signal to a frame reception process unit 33.

The CPU 22 reads a program stored in the non-volatile memory 24 etc., and functions as a HELLO control unit 31, the frame transmission process unit 32, the frame reception process unit 33, the routing unit 34, the alive-or-dead monitoring unit 35 and an application process unit 36.

The frame reception process unit 33 assigns frames input from the reception unit 37 so that the routing unit 34 and the alive-or-dead monitoring unit 35 process the frames. Frames assigned by the frame reception process unit 33 include a route information frame, a control frame other than route information frame, a data frame that has stored user data, etc. The frame reception process unit 33 outputs assigned frames to the routing unit 34 and the alive-or-dead monitoring unit 35.

When a frame addressed to the node 21 is input from the routing unit 34, the application process unit 36 processes the input frame by using an application program. The application process unit 36 can also generate a data frame to be transmitted to the different node 31 by the process of an application program. The application process unit 36 outputs generated data frames to the routing unit 34.

The routing unit 34 determines whether or not an input frame is a frame addressed to the node owning the routing unit 34 or a frame that was broadcast, and when the frame is addressed to the node owning the routing unit 34, the routing unit 34 reports the fact to the application process unit 36. The routing unit 34 registers the transmission source of a received HELLO message in the routing table 39, in accordance with the ad hoc header included in the input frame. Also, the routing unit 34 calculates the route quality and communication quality of the links between nodes by using node information included in a received HELLO message, and registers the result in the routing table 39 and the link table. The routing unit 34 controls the frame transmission process unit 32 so that frames including information registered in the routing table 39 and the link table are transmitted.

Also, when a data frame is input, the routing unit 34 determines whether or not the transmission destination node obtained from the data frame is in an alive-or-dead monitoring abnormality state on the basis of the alive-or-dead monitoring abnormality flag recorded in the routing table 39. On the basis of the determination result, the routing unit 34 determines the destination of the data frame from the transmission destination node apparatus obtained from the data frame and the transmission source node apparatus obtained from the data frame.

When the destination of a data frame is determined to be the transmission source node obtained from the data frame on the basis of the determination result, the routing unit 34 sets transmission failure flag=ON in the data frame.

Also, when the routing unit 34 has received a data frame which was generated and transmitted by the node owning the routing unit 34 and in which the transmission failure flag has been set to be ON, the routing unit 34 changes the destination of a data frame to a different node apparatus that is registered beforehand.

Also, when the alive-or-dead monitoring abnormality flag is ON (abnormal) in the routing table 39 for the destination node of a data frame generated by the application process unit, the routing unit 34 does not transmit data frames to that node. In such a case, the routing unit 34 changes the destination to a different node apparatus that is registered beforehand and the transmits frames.

The HELLO control unit 31 generates a HELLO message by using information registered in the routing table 39 and outputs the message to the frame transmission process unit 32. The HELLO control unit 31 can generate a Hello frame including information about a route included in the routing table 39.

The frame transmission process unit 32 transmits frames by controlling the transmission unit 38.

When a prescribed period of time has elapsed without receiving HELLO message frames from an adjacent node registered in the routing table 39, the alive-or-dead monitoring unit 35 determines that that adjacent node is not capable of performing communications due to abnormality. Then, the alive-or-dead monitoring unit 35 sets, to ON, the alive-or-dead monitoring abnormality flag stored in the routing table 39 addressed to the node of the abnormality. Also, when a Hello frame in which the alive-or-dead monitoring abnormality flag has been set to ON for a node not adjacent from the node owning the alive-or-dead monitoring unit 35 has been received from an adjacent node, the alive-or-dead monitoring unit 35 executes the following processes. Specifically, the alive-or-dead monitoring unit 35 sets, to ON, the alive-or-dead monitoring abnormality flag stored in the routing table 39 addressed to the node for which the alive-or-dead monitoring abnormality flag is set to ON in that Hello frame. Also, the alive-or-dead monitoring unit 35 transmits an alive-or-dead monitoring abnormality OFF request via the frame transmission process unit 32.

By using a node as described above, explanations will be given for examples below.

Example 1

In example 1, explanations will be given for propagation of the fact that a node is in an alive-or-dead monitoring abnormality state to all nodes in an ad hoc network when alive-or-dead monitoring abnormality has been detected in that node.

Figure 16:
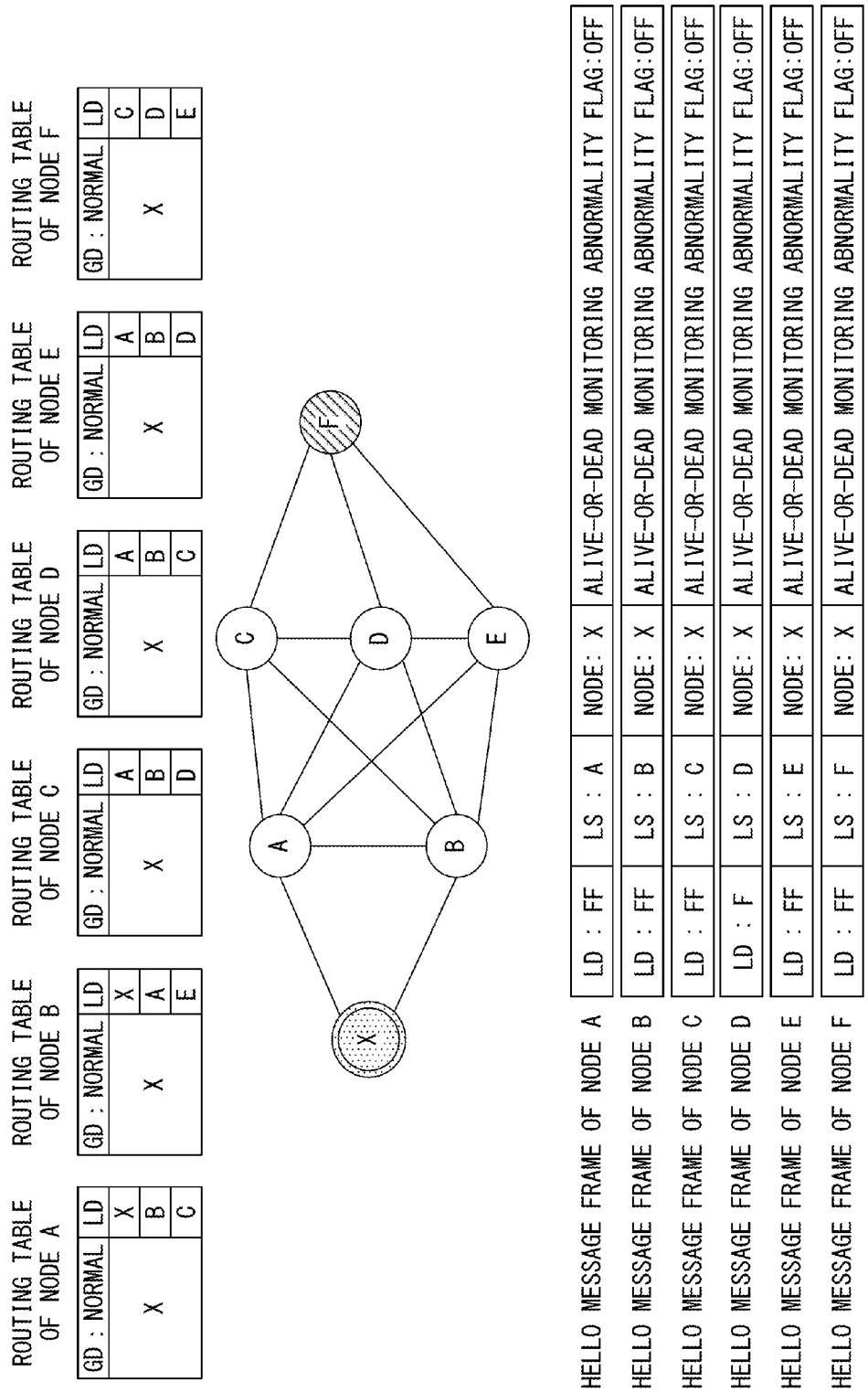
FIG. 16 explains propagation procedures of a report of alive-or-dead monitoring abnormality in the present embodiment (example 1) (first)

FIG. 16 through FIG. 19 explain propagation procedures of a report of alive-or-dead monitoring abnormality in the present embodiment (example 1). FIG. 16 shows the routing table and the HELLO message frame of each node in a case when an ad hoc network has been established normally. Each node has broadcast a HELLO message frame in which the alive-or-dead monitoring abnormality flag has been set to OFF to adjacent nodes. "Broadcast" used herein is "broadcast to all adjacent nodes", and not "broadcast to entire network".

It is assumed that abnormality has thereafter occurred in node X and node X has become unable to perform communications as shown in FIG. 17.

FIG. 17 explains operations in a case when nodes A and B have detected that node X is in an alive-or-dead monitoring abnormality state. Nodes A and B determine that node X is in an alive-or-dead monitoring abnormality state because a prescribed period of time has elapsed without receiving HELLO message frames from node X.

Nodes A and B revise, by using HELLO message frames received from adjacent nodes, routes LD1 through LD3 in the routing tables addressed to node X, in which alive-or-dead monitoring abnormality has been detected. At the same time, nodes A and B sets the alive-or-dead monitoring abnormality flags to ON (abnormal) in the routing tables addressed to node X.

Next, as shown in FIG. 18, a node having detected that node X is in an alive-or-dead monitoring abnormality state reports the alive-or-dead monitoring abnormality in node X to surrounding nodes. Nodes A and B that detected alive-or-dead monitoring abnormality in node X set the alive-or-dead monitoring abnormality flag to ON (abnormal) in HELLO message frames (1-i) and (1-ii) to be transmitted subsequently and transmit the frames.

When nodes C, D and E have received HELLO message frames (1-i) and (1-ii) transmitted from nodes A and B, nodes C, D and E detect that node X is in an alive-or-dead monitoring abnormality state from the frame headers of the received frames. Then, nodes C, D and E respectively turn ON (abnormal) the alive-or-dead monitoring abnormality flags in the routing tables addressed to node X.

Figure 19:
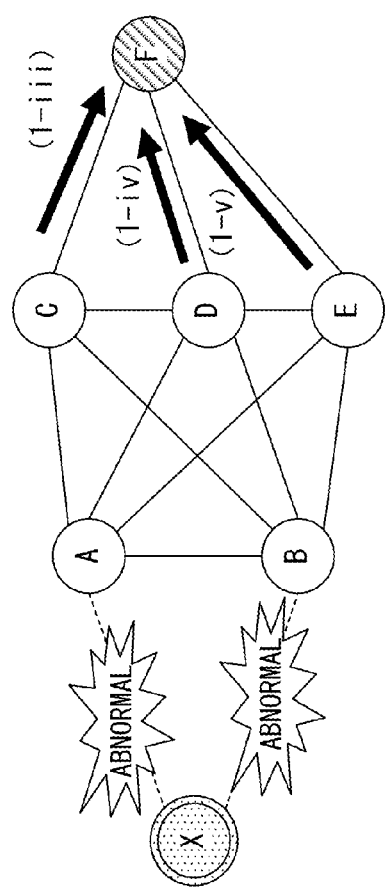
FIG. 19 explains propagation procedures of a report of alive-or-dead monitoring abnormality in the present embodiment (example 1) (fourth)

As shown in FIG. 19, similarly to nodes A and B, the fact that node X is in an alive-or-dead monitoring abnormality state is reported regarding nodes C, D and E as well. Specifically, nodes C, D and E that detected the alive-or-dead monitoring abnormality in node X set, to ON, the alive-or-dead monitoring abnormality flags (abnormal) in HELLO message frames (1-iii), (1-iv) and (1-v) to be transmitted subsequently and transmit the frames.

Node F receives HELLO message frames (1-iii), (1-iv) and (1-v) transmitted from nodes C, D and E. Then, node F detects that node X is in an alive-or-dead monitoring abnormality state, and sets the alive-or-dead monitoring abnormality flag to ON (abnormal) in the routing table addressed to node X.

As described above, by making a HELLO message frame transmitted by a node include information about a node in a alive-or-dead monitoring abnormality state, it is possible to report to surrounding nodes the fact that a node is in an alive-or-dead monitoring abnormality state.

Example 2

In example 2, explanations will be given for the flow of data between nodes in a state where an ad hoc network has been established normally and for a flow of data between nodes in a case where there is a node in a alive-or-dead monitoring abnormality state.

Figure 20:
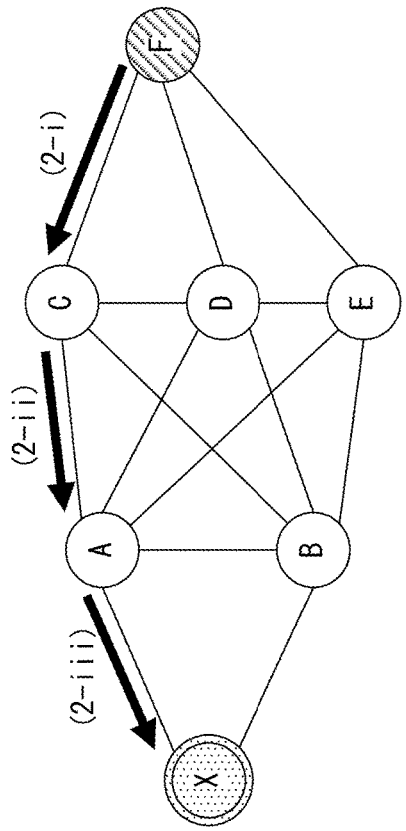
FIG. 20 shows a flow of data in a case where data has been transmitted from node F to node X in a state that an ad hoc network has been established normally in the present embodiment (example 2)

FIG. 20 shows a flow of data in a case where data has been transmitted from node F to node X in a state that an ad hoc network has been established normally in the present embodiment (example 2). Node F transmits a data frame to node X. In this example, node F transmits data frame (2-i) to node C, which is the first candidate (LD1) of the optimum route in the routing table addressed to node X.

Node C transfers data frame (2-ii) to node X. In this example, node C transfers data frame (2-ii) to node A, which is the first candidate (LD1) of the optimum route in the routing table addressed to node X, because the alive-or-dead monitoring abnormality flag is OFF (normal) in the routing table addressed to node X included in node C.

Node A transfers data frame (2-iii) to node X. In this example, node A transfers data frame (2-iii) to node X (GD), which is the first candidate (LD1) of the optimum route in the routing table addressed to node X, because the alive-or-dead monitoring abnormality flag is OFF (normal) in the routing table addressed to node X included in node A.

Next, explanations will be given by referring to FIG. 21 for a flow of data frames in a case where node A detects the alive-or-dead monitoring abnormality in node X and a data frame addressed to node X has been transmitted from node F without the abnormality detection being reported to node C or F. It is assumed that node X is set as the first candidate of a node that is connected to an external network such as a server, and node Y is set as the second candidate.

Node F transmits data frame (2-iv) addressed to node X. In this example, node F transmits data frame (2-iv) to node C, which is LD1, because the alive-or-dead monitoring abnormality flag is OFF (normal) in the routing table addressed to node X included in node F.

Node C transfers data frame (2-v) to node X (GD). In this example, node C transfers data frame (2-v) to node A, which is the first candidate (LD1) of the optimum route in the routing table addressed to node X, because the alive-or-dead monitoring abnormality flag is OFF (normal) in the routing table addressed to node X included in node C.

Node A transfers data frame (2-vi) to node F (GS). In this example, node A returns data frame (2-vi) to node F, which is a GS, and does not return the data frame to node X, which is a GD, because the alive-or-dead monitoring abnormality flag is ON (alive-or-dead monitoring abnormality (=communication is impossible)) in the routing table addressed to node X included in node A. In that transfer, node A sets the transmission failure flag to ON in the data frame and transfers data frame (2-vi) to node C, which is the first candidate (LD1) of the optimum route in the routing table addressed to node F.

Node C transfers data frame (2-vii) to node F (GS). In this example, node C returns the data frame to node F, which is a GS, and does not return the data frame to node X, which is a GD, because the alive-or-dead monitoring abnormality flag is ON in received data frame. Node C transfers data frame (2-vii) to node F, which is the first candidate (LD1) of the optimum route in the routing table addressed to node F.

Node F determines that transfer of a data frame to the first candidate node X has failed because the transmission failure flag of the received frame is ON. In such a case, node F changes the transmission destination (GD) to node Y, which is the second candidate, and transfers data frame (2-viii) to node G, which is LD1, by referring to the routing table addressed to node Y.

Node G transfers data frame (2-ix) addressed to node Y (GD) to node H (LD). Node H transfers data frame (2-x) addressed to node Y (GD) to node Y (LD).

As described above, node F does not transmit a data frame addressed to node X alive-or-dead the alive-or-dead monitoring abnormality flag has become ON (abnormal) in the routing table addressed to node X.

Example 3

In example 3, explanations will be given for a process of cancelling alive-or-dead monitoring abnormality set in the routing table of each node in an ad hoc network. Explanations will be given by referring to FIG. 22 through FIG. 24 for a process in which the cancellation of alive-or-dead monitoring abnormality in node X is reported to all nodes in the ad hoc network according to the present embodiment (example 3).

Figure 22:
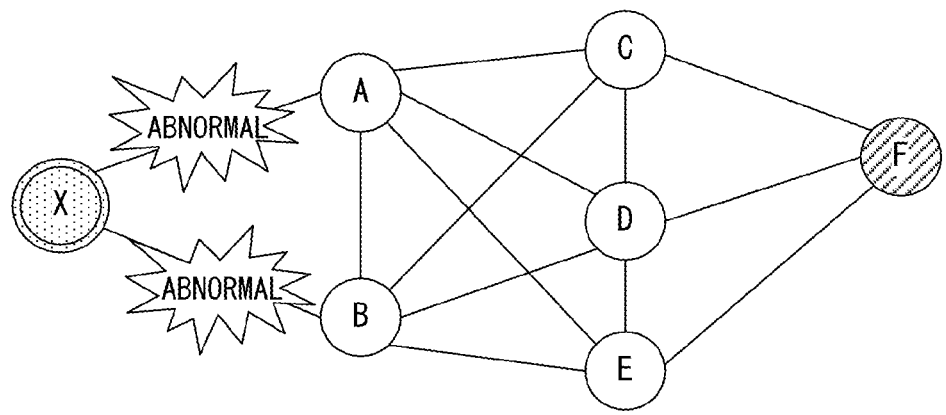
FIG. 22 explains cancellation of alive-or-dead monitoring abnormality in node X is reported to all nodes in an ad hoc network in the present embodiment (example 3) (first)

FIG. 22 explains a state in which nodes A and B detected alive-or-dead monitoring abnormality in node X and the cancellation of alive-or-dead monitoring abnormality in node X has been reported to all nodes in the ad hoc network. In such a case, the alive-or-dead monitoring abnormality flags have been set to ON (abnormal) in the routing tables addressed to node X (GD) included in all nodes.

Figure 23:
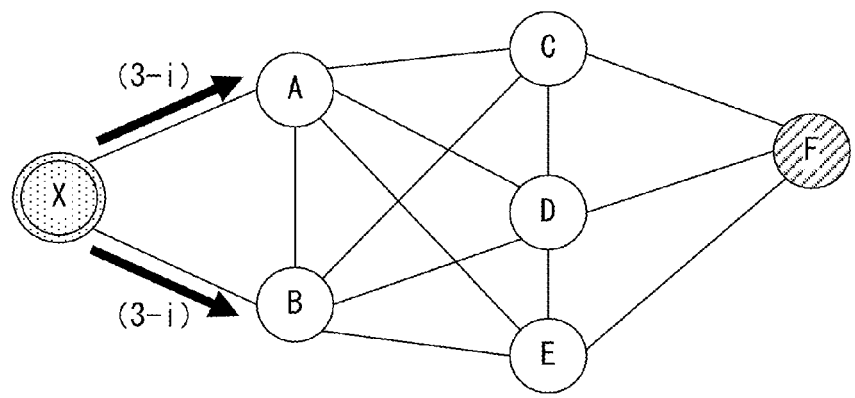
FIG. 23 explains cancellation of alive-or-dead monitoring abnormality in node X being reported to all nodes in an ad hoc network in the present embodiment (example 3) (second)

Thereafter, when node X has recovered, node X transmits alive-or-dead monitoring abnormality OFF request frames (broadcast frames). FIG. 23 shows the routing table, of each node, addressed to node X (GD) when nodes A and B received an alive-or-dead monitoring abnormality OFF request frame from node X.

The processes performed by nodes that received alive-or-dead monitoring abnormality OFF request frames (broadcast frames) vary between a node as the first hop counting from the node that received the alive-or-dead monitoring abnormality OFF request frame and nodes as the second and subsequent hops counting from the node that received the frame. The nodes as the first hop counting from the node that received an alive-or-dead monitoring abnormality OFF request frame in FIG. 23 are nodes A and B, which directly received alive-or-dead monitoring abnormality OFF request frames from node X. Also, the nodes as the second and subsequent hops counting from the node that received an alive-or-dead monitoring abnormality OFF request flag in FIG. 23 are nodes such as nodes C, D, E and F that received alive-or-dead monitoring abnormality OFF request frames transferred by nodes other than node X.

The node as the first hop changes the alive-or-dead monitoring abnormality flag to OFF (normal) in the routing table in which transmission source node X of the alive-or-dead monitoring abnormality OFF request frame is a GD, and changes LD1 in the routing table addressed to node X to transmission source node X. Nodes as the second and subsequent hops change alive-or-dead monitoring abnormality flags to OFF (normal) in the routing tables in which transmission source node X of the alive-or-dead monitoring abnormality OFF request frame is a GD.

Figure 24:
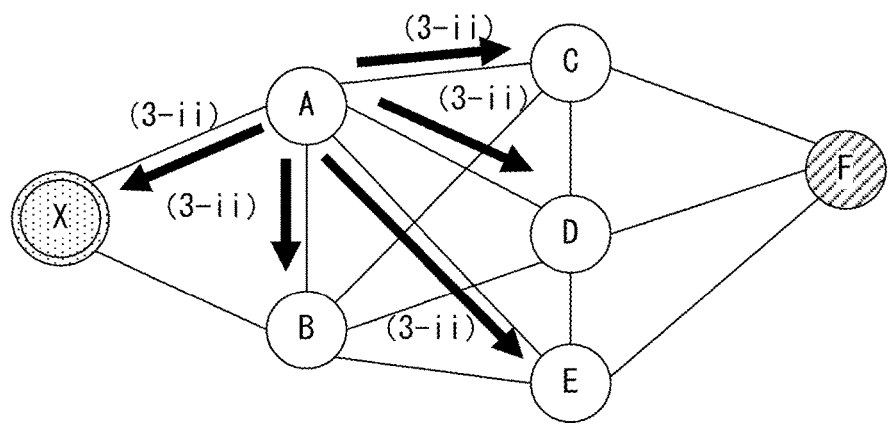
FIG. 24 explains cancellation of alive-or-dead monitoring abnormality in node X is reported to all nodes in an ad hoc network in the present embodiment (example 3) (third)

FIG. 24 shows the routing table of each node after node A received an alive-or-dead monitoring abnormality OFF request frame from node X and transmitted the alive-or-dead monitoring abnormality OFF request frames (broadcast frames). Note that although node B also transmits alive-or-dead monitoring abnormality OFF request frames, the explanations thereof are omitted.

Thereafter, node F receives an alive-or-dead monitoring abnormality OFF request frame transmitted by node F, C, D or E, and changes the alive-or-dead monitoring abnormality flag to OFF (normal) in the routing table addressed to node X.

Next, explanations will be given for a process flow of a node in examples 1 through 3.

FIG. 25 shows a flow of the entire process of a node according to the present embodiment (examples 1 through 3). The CPU 22 reads a program stored in the non-volatile memory 24 etc., and functions as the HELLO control unit 31, the frame transmission process unit 32, the frame reception process unit 33, the routing unit 34, the alive-or-dead monitoring unit 35 and the application process unit 36 so as to execute the process shown in FIG. 25.

First, the CPU 22 performs an alive-or-dead monitoring process (S1). S1 will be explained in detail by referring to FIG. 27.

The CPU 22 determines whether or not timing of transmitting a HELLO message frame has arrived (S2). When timing of transmitting a HELLO message frame has arrived (Yes in S2), the CPU 22 performs a HELLO message frame generation/transmission process (S8). S8 will be explained in detail by referring to 26.

When timing of transmitting a HELLO message frame has not arrived (No in S2), the CPU 22 generates a data frame (S9) when the node owning the CPU 22 is to generate a data frame (Yes in S3). After the process of S9, the process proceeds to S6.

The CPU 22 assigns a frame (S5) when a frame has been received from the wireless communication I/F 25 (Yes in S4). When the received frame is a data frame (Yes in S5), the CPU 22 performs a routing process (S6). S6 will be explained later in detail by referring to FIGS. 28A and 28B.

When a received frame is a HELLO message frame (No in S5), the CPU 22 performs a route establishment process (S7). S7 will be explained in detail by referring to FIG. 29.

Figure 26:
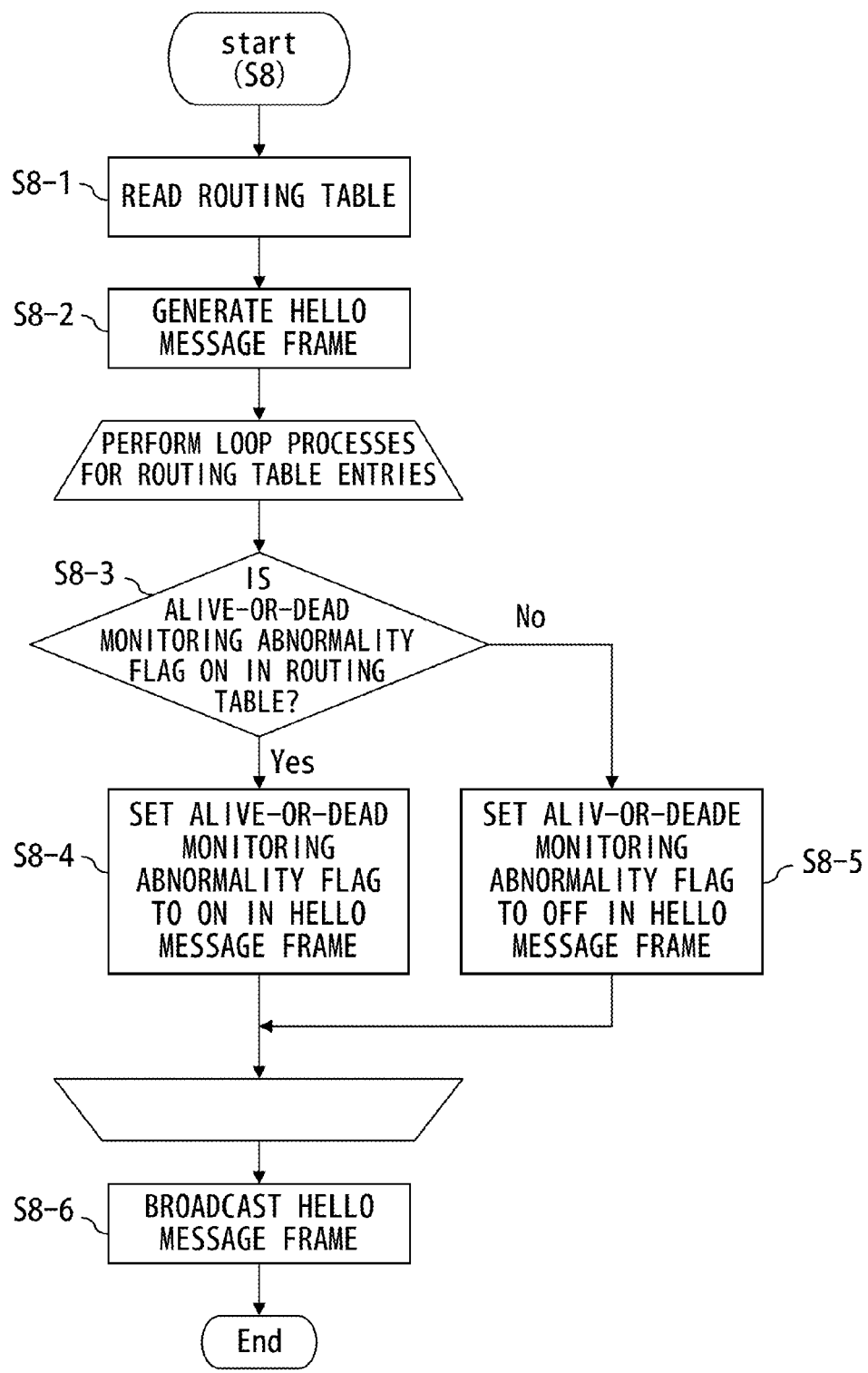
FIG. 26 is a detailed flow of a HELLO message frame generation/transmission process (S8) according to the present embodiment.

FIG. 26 is a detailed flow of the HELLO message frame generation/transmission process (S8) according to the present embodiment. The CPU 22 reads the routing table 39 from the RAM 23 (S8-1).

The CPU 22 generates a HELLO message frame (S8-2). A HELLO message frame is provided with a header that includes fields for a local destination address (LD), a local source address (LS), a global destination address (GD), a global source address (GS), a frame ID (FID), a type and alive-or-dead monitoring abnormality flag. In this example, the CPU 22 sets, in LD of the HELLO message frame, a prescribed value referred to as value FF, which represents broadcasting to all adjacent nodes, and sets the address of the node of the CPU 22 in LS.

Also, "broadcast" used herein represents "broadcast to all adjacent nodes", not "flooding to the entire network".

The CPU 22 determines whether or not the alive-or-dead monitoring abnormality flag of the read routing table 39 is ON (S8-3). When the alive-or-dead monitoring abnormality flag of the routing table 39 is ON (Yes in S8-3), the CPU 22 performs the following processes. Specifically, the CPU 22 sets the alive-or-dead monitoring abnormality flag for a node set for the GD in the routing table 39 to ON in a HELLO message frame (S8-4). In the setting of a alive-or-dead monitoring abnormality flag regarding the node for a HELLO message frame, the bit representing abnormality of that node is tuned ON. For example, it is also possible to set a node ID for identifying a node of alive-or-dead monitoring abnormality in an item that is not used effectively in a HELLO message frame in broadcasting and to turn ON the bit of the alive-or-dead monitoring abnormality flag field. It is also possible to provide a field for specifying a alive-or-dead monitoring abnormality node in the header of a frame and to set a node ID of an alive-or-dead monitoring abnormality node in that field.

When the alive-or-dead monitoring abnormality flag in the routing table 39 is OFF (No in S8-3), the CPU 22 performs the following process. Specifically, the CPU 22 sets the alive-or-dead monitoring abnormality flag for a node set in GD of the routing table 39 to OFF in a HELLO message frame (S8-5).

The processes of S8-3 through S8-5 are repeated as many times as there are GDs that are registered in the routing table 39 stored in the RAM 23.

The CPU 22 performs broadcast of the generated HELLO message frame (S8-6). This makes it possible to transmit a plurality of entries in a routing table by one HELLO message frame.

Figure 27:
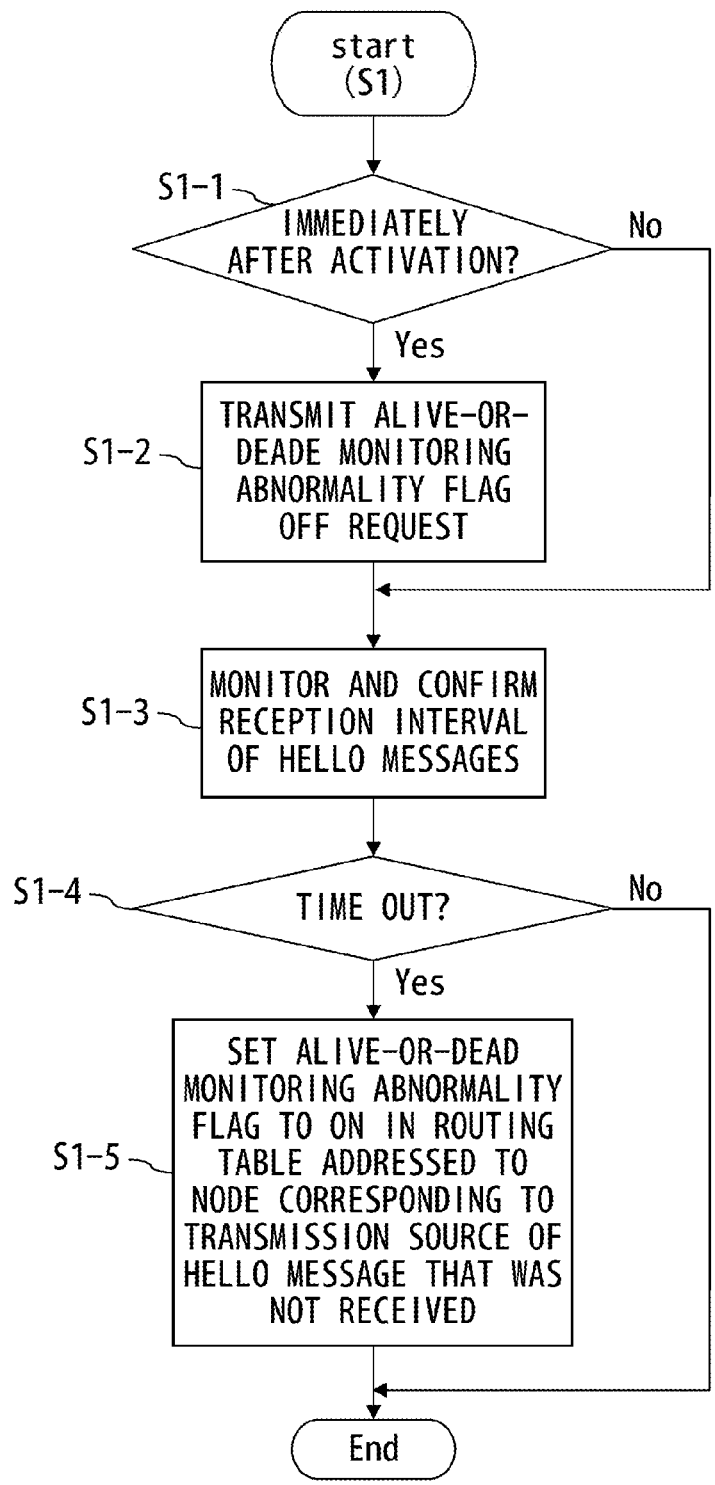
FIG. 27 shows a detailed flow of an alive-or-dead monitoring process (S1) according to the present embodiment.

FIG. 27 shows a detailed flow of the alive-or-dead monitoring process (S1) according to the present embodiment. When the node is not in a state immediately after the activation (S1-1), the process proceeds to S1-3. When the node is in a state immediately after the activation (Yes in S1-1), The CPU 22 broadcasts an alive-or-dead monitoring abnormality OFF request to all adjacent node apparatuses (S1-2).

Next, the CPU 22 monitors and confirms reception intervals of HELLO messages transmitted from respective nodes registered as GDs in the routing table 39 that is stored in the RAM 23 (S1-3).

When it was impossible to receive a HELLO message from one of nodes registered as GDs in the routing table 39 in a prescribed period for monitoring as a result of the confirmation of the intervals (Yes in S1-4), the CPU 22 performs the following process. Specifically, the CPU 22 turns ON the alive-or-dead monitoring abnormality flag in the routing table 39 addressed to that node (GD) (S1-5).

Figure 28A:
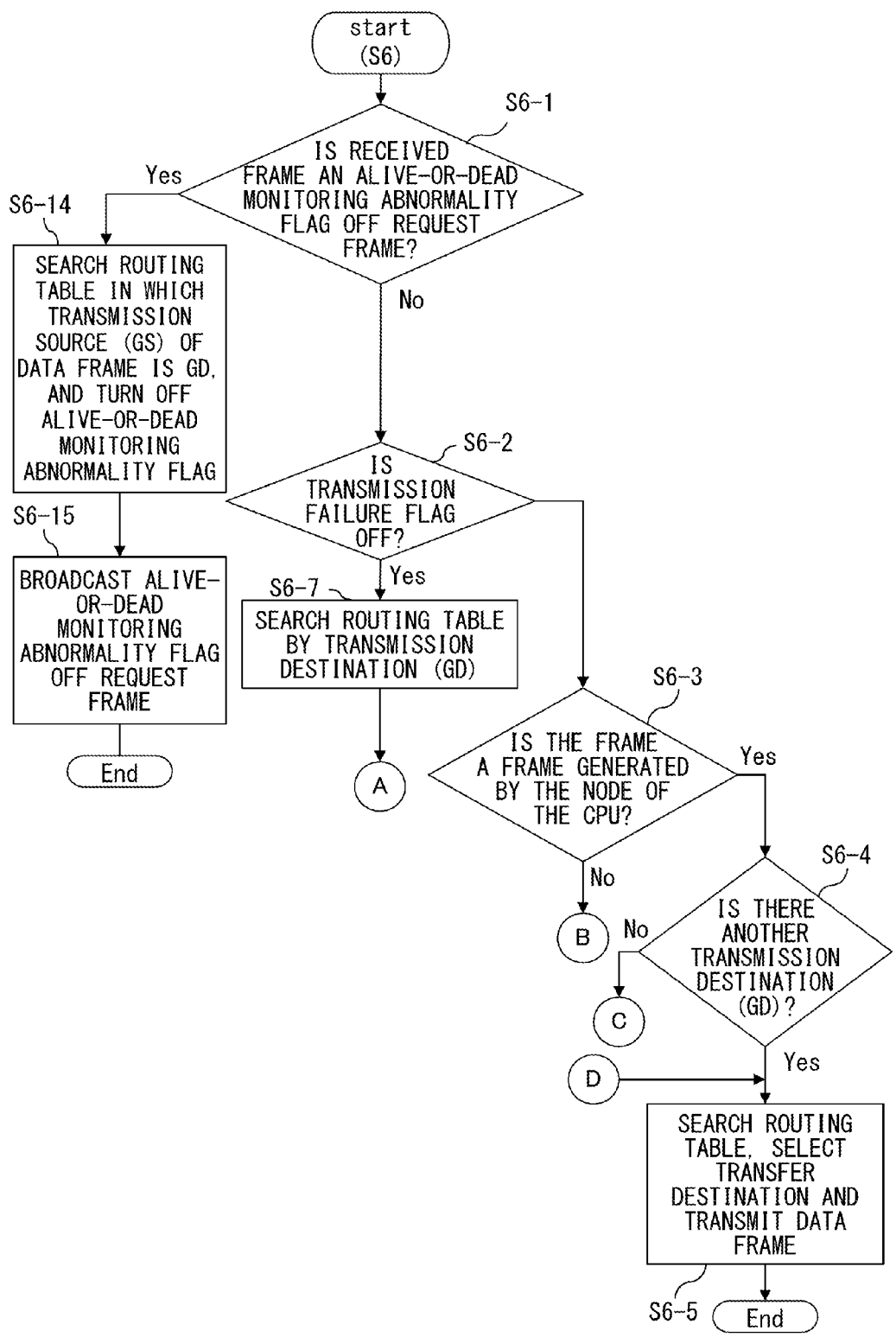

FIGS. 28A and 28B are a detailed flow of the routing process (S6) according to the present embodiment. The CPU 22 determines whether or not a received frame is an alive-or-dead monitoring abnormality OFF request frame (S6-1).

When a received frame is an alive-or-dead monitoring abnormality OFF request frame (Yes in S6-1), the CPU 22 performs the following process. The CPU 22 searches the routing table in which the transmission source (GS) of the data frame is a GD, and turns OFF the alive-or-dead monitoring abnormality flag of the searched routing table (S6-14).

The CPU 22 broadcasts an alive-or-dead monitoring abnormality OFF request frame (S6-15). Note that "broadcast" used herein is broadcast accompanied by flooding to the entire network.

When the received frame is not an alive-or-dead monitoring abnormality OFF request frame (No in S6-1), the CPU 22 determines whether or not the transmission failure flag included in the header of the received frame is OFF (S6-2).

When the transmission failure flag in the header of the received frame is OFF (Yes in S6-2), the CPU 22 obtains the global destination address (GD) from the header of the received frame, and searches the routing table for that GD (S6-7).

The CPU 22 determines whether or not the alive-or-dead monitoring abnormality flag in the searched routing table is ON (S6-8).

When the alive-or-dead monitoring abnormality flag in the searched routing table is OFF (No in S6-8), the CPU 22 selects a transfer destination from the local destination address (LD1, LD2 and LD3) stored in the searched routing table. The CPU 22 transmits a data frame to the selected transfer destination as the local destination address (LD).

When the alive-or-dead monitoring abnormality flag in the searched routing table is ON (Yes in S6-8), the CPU 22 determines whether or not that frame is a frame that was generated by the node owning the CPU 22 (S6-9).

When the frame is a frame generated by the node owning the CPU 22 (Yes in S6-9), the CPU 22 determines whether or not there is another transmission destination (GD) (S6-11). When there is another transmission destination (GD) (Yes in S6-11), the CPU 22 performs the process of S6-5. When there are no other transmission destinations (GDs) (No in S6-11), the CPU 22 discards the data frame without transmitting the data frame (S6-12). When the frame is not a frame generated by the node owning the CPU 22 (No in S6-9), the CPU 22 sets the transmission failure flag in the data frame to ON (S6-10), and the process proceeds to S6-6.

When the transmission failure flag included in the header of the received frame is ON, (No in S6-2), the CPU 22 determines whether or not that frame is a frame generated by the node owning the CPU 22 (S6-3).

When the node is a node generated by the node owning the CPU 22 (Yes in S6-3), the CPU 22 determines whether or not there is another transmission destination (GD) (S6-4). When there are no other transmission destinations (GDs) (No in S6-4), the CPU 22 performs the process of S6-12. When there is another transmission destination (GD) (Yes in S6-4), the CPU 22 searches the routing table for that GD. The CPU 22 selects a transfer destination from among the local destination addresses (LD1, LD2 and LD3) stored in the searched routing table. The CPU 22 transmits a data frame to the local destination address (LD) as the selected transfer destination (S6-5).

When the frame is not a frame generated by the node owning the CPU 22 (No in S6-3), the CPU 22 obtains the global source address (GS) from the header of the received frame and searches the routing table in which that GS is a GD. The CPU selects a transfer destination from among the local destination addresses (LD1, LD2 and LD3) stored in the searched routing table. The CPU 22 transmits a data frame to the local destination address (LD) as the selected transfer destination (S6-6). In the data frame transmitted then, the transmission failure flag is ON.

Figure 29:
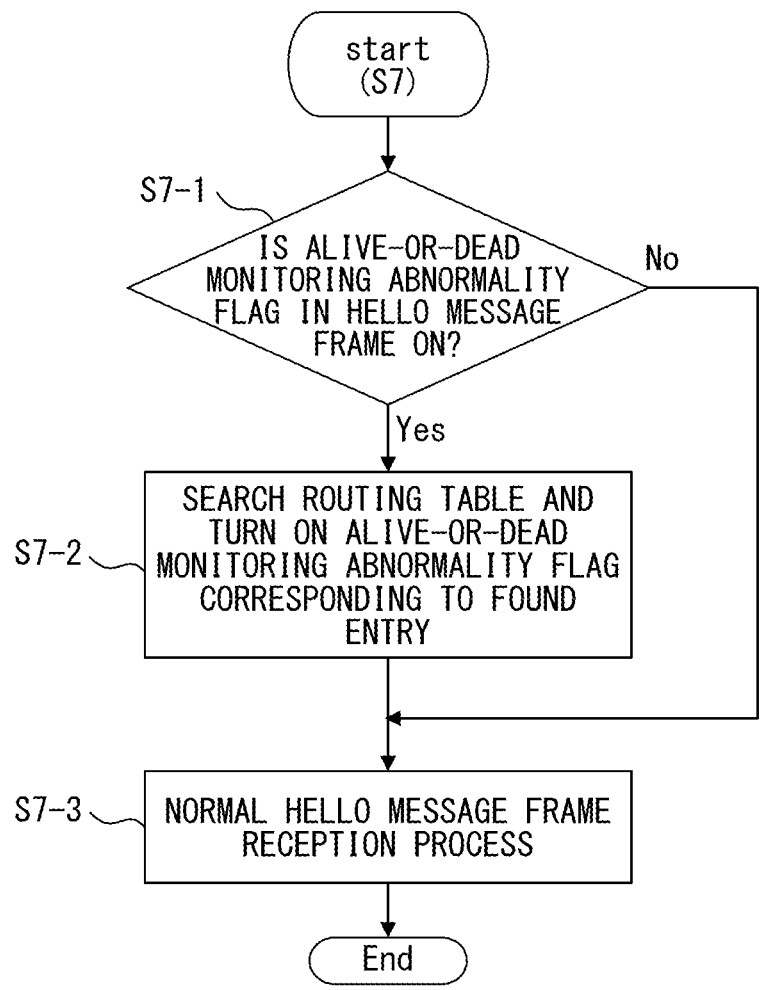
FIG. 29 shows a detailed flow of a route establishment process (S7) according to the present embodiment.

FIG. 29 shows a detailed flow of the route establishment process (S7) according to the present embodiment. The CPU 22 determines whether or not the alive-or-dead monitoring abnormality flag set in the received HELLO message frame is ON (S7-1). When the alive-or-dead monitoring abnormality flag set in the received HELLO message frame is OFF, the process proceeds to S7-3.

When the alive-or-dead monitoring abnormality flag set in the received HELLO message frame is ON (Yes in S7-1), the CPU 22 reads the node ID set based on an abnormality state detected by alive-or-dead monitoring from the HELLO message frame. The CPU 22 searches the routing table in which the read node ID is a GD. The CPU 22 sets the alive-or-dead monitoring abnormality flag of the searched routing table to ON (S7-2).

Thereafter, the CPU 22 performs a normal HELLO message frame reception process (S7-3). For example, the CPU 22 calculates the communication quality of each route on the basis of information set in the HELLO message frame, and establishes a plurality of routes to the final destination on the basis of the calculation result. In this process, the CPU 22 creates, updates or deletes a link table and also creates, updates or deletes a routing table.

According to an aspect of the present embodiments, it is possible to control the routing of a data frame in an ad hoc network on the basis of the alive-or-dead state of a node apparatus.

Note that the present embodiments are not limited to the embodiments described above and various configurations or embodiments may be employed without departing from the spirit of the present embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A node apparatus that establishes a wireless communication network through wireless communication with other node apparatuses adjacent to the node apparatus, the node apparatus comprising:
   a memory configured to store node alive-or-dead information, which represents whether or not a node apparatus is in an abnormal state;
   a controller configured to perform processes including:
      receiving a data frame;
      performing determination regarding an alive-or-dead state for a transmission destination node apparatus obtained from the received data frame on the basis of the node alive-or-dead information stored in the memory;
      determining a transfer destination of the received data frame from a transmission destination node apparatus obtained from the received data frame and a transmission source node apparatus obtained from the received data frame on the basis of a result of the determination; and
      setting to the received data frame the determined transfer destination as a destination of the received data frame; and
   a transmitter configured to transmit the received data frame in which the determined transfer destination is set as a destination of the received data frame.

2. The node apparatus according to claim 1, wherein
   the controller included in the node apparatus that is a first node apparatus further obtains the node alive-or-dead information for a second node apparatus adjacent to the first node apparatus or node alive-or-dead information for a third node apparatus not adjacent to the first node apparatus.

3. The node apparatus according to claim 1, wherein
   the transmitter included in the node apparatus that is a first node apparatus further transmits, to a second node apparatus, the node alive-or-dead information for the second node apparatus adjacent to the first node apparatus or node alive-or-dead information for a third node apparatus not adjacent to the first node apparatus.

4. The node apparatus according to claim 1, wherein
   the controller included in the node apparatus that is a first node apparatus adds transmission failure information, which represents a failure of transmission to the transmission destination node apparatus obtained from the received data frame, to the received data frame when the transmission source node apparatus obtained from the received data frame is determined as the transfer destination of the received data frame on the basis of a result of the determination.

5. The node apparatus according to claim 4, wherein
   the controller further
      changes a destination of a data frame to a different node apparatus when the data frame which was generated and transmitted by the first node apparatus and to which the transmission failure information is added has been received.

6. The node apparatus according to claim 1, wherein
   the controller further
      transmits, to an adjacent node apparatus, a request that the node alive-or-dead information of a node apparatus that recovered from an abnormal state be changed from an abnormal state to a normal state.

7. A non-transitory computer-readable recording medium having stored therein a program for causing a computer to execute a process, the computer being a node apparatus that establishes a wireless communication network through wireless communication with an adjacent node apparatus, the process comprising:
   receiving a data frame;
   performing determination regarding an alive-or-dead state for a transmission destination node apparatus obtained from the received data frame on the basis of the node alive-or-dead information, which represents whether or not a node apparatus is in an abnormal state, read from a memory,
   determining a transfer destination of the received data frame from a transmission destination node apparatus obtained from the received data frame and a transmission source node apparatus obtained from the received data frame on the basis of a result of the determination,
   setting to the received data frame the determined transfer destination as a destination of the received data frame, and
   transmitting the received data frame in which the determined transfer destination is set as a destination of the received data frame.

8. The non-transitory computer-readable recording medium according to claim 7, the process further comprising:
   obtaining the node alive-or-dead information for a second node apparatus adjacent to the computer that is a first node apparatus or node alive-or-dead information for a third node apparatus not adjacent to the first node apparatus.

9. The non-transitory computer-readable recording medium according to claim 7, the process further comprising
   transmitting, to a second node apparatus, the node alive-or-dead information for the second node apparatus adjacent to the computer that is a first node apparatus or node alive-or-dead information for a third node apparatus not adjacent to the first node apparatus.

10. The non-transitory computer-readable recording medium according to claim 7, wherein the determining adds transmission failure information, which represents a failure of transmission to the transmission destination node apparatus obtained from the received data frame, to the received data frame when the transmission source node apparatus obtained from the received data frame is determined as the transfer destination of the received data frame on the basis of a result of the determination.

11. The non-transitory computer-readable recording medium according to claim 9, the process further comprising:

changing a destination of a data frame to a different node apparatus when the data frame which was generated and transmitted by the first node apparatus and to which the transmission failure information is added has been received.

12. The non-transitory computer-readable recording medium according to claim 7, the process further comprising transmitting, to an adjacent node apparatus, a request that the node alive-or-dead information of a node apparatus that recovered from an abnormal state be changed from an abnormal state to a normal state.

13. An operating method for a node apparatus that establishes a wireless communication network through wireless communication with other node apparatuses adjacent to the node apparatus, the operating method comprising:

receiving a data frame;

performing determination regarding an alive-or-dead state for a transmission destination node apparatus obtained from the received data frame on the basis of node alive-or-dead information, which represents whether or not a node apparatus is in an abnormal state, read from a memory, by using the node apparatus, determining a transfer destination of the received data frame from a transmission destination node apparatus obtained from the received data frame and a transmission source node apparatus obtained from the received data frame on the basis of a result of the determination, by using the node apparatus, setting to the received data frame the determined transfer destination as a destination of the received data frame, and transmitting the received data frame in which the determined transfer destination is set as a destination of the received data frame, by using the node apparatus.

14. The operating method according to claim 13, further comprising obtaining by using the node apparatus that is a first node apparatus the node alive-or-dead information for a second node apparatus adjacent to the first node apparatus or node alive-or-dead information for a third node apparatus not adjacent to the first node apparatus.

15. The operating method according to claim 13, further comprising transmitting by using the node apparatus that is a first node apparatus, to the second node apparatus, the node alive-or-dead information for a second node apparatus adjacent to the first node apparatus or node alive-or-dead information for a third node apparatus not adjacent to the first node apparatus.

* * * * *